(12) United States Patent
Lee et al.

(10) Patent No.: US 8,451,710 B2
(45) Date of Patent: May 28, 2013

(54) SUB-PACKET PULSE-BASED COMMUNICATIONS

(75) Inventors: Chong U. Lee, San Diego, CA (US); Amal Ekbal, San Diego, CA (US); David Jonathan Julian, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 298 days.

(21) Appl. No.: 11/740,815

(22) Filed: Apr. 26, 2007

(65) Prior Publication Data

US 2007/0291684 A1    Dec. 20, 2007

Related U.S. Application Data

(60) Provisional application No. 60/795,435, filed on Apr. 26, 2006, provisional application No. 60/795,771, filed on Apr. 28, 2006.

(51) Int. Cl.
*H04J 7/00* (2006.01)

(52) U.S. Cl.
USPC ......................................... 370/212

(58) Field of Classification Search
USPC ................................. 370/212, 205
See application file for complete search history.

(56) References Cited

U.S. PATENT DOCUMENTS

| | | | |
|---|---|---|---|
| 5,687,169 A | 11/1997 | Fullerton | |
| 5,764,696 A | 6/1998 | Barnes et al. | |
| 5,812,081 A | 9/1998 | Fullerton | |
| 5,832,035 A | 11/1998 | Fullerton | |
| 5,907,427 A | 5/1999 | Scalora et al. | |
| 5,952,956 A | 9/1999 | Fullerton | |
| 5,960,031 A | 9/1999 | Fullerton et al. | |
| 5,963,581 A | 10/1999 | Fullerton et al. | |
| 5,969,663 A | 10/1999 | Fullerton et al. | |
| 5,973,634 A | 10/1999 | Kare | |
| 5,995,534 A | 11/1999 | Fullerton et al. | |
| 6,031,862 A | 2/2000 | Fullerton et al. | |

(Continued)

FOREIGN PATENT DOCUMENTS

| | | |
|---|---|---|
| CA | 2332575 | 12/1999 |
| CN | 1220567 A | 6/1999 |

(Continued)

OTHER PUBLICATIONS

Written Opinion—PCT/US07/067572, International search Authority—European Patent Office—Nov. 28, 2007.

(Continued)

*Primary Examiner* — Mark Rinehart
*Assistant Examiner* — Matthew Hopkins
(74) *Attorney, Agent, or Firm* — Paul S. Holdaway

(57) ABSTRACT

Low power wireless communication techniques may be employed in devices that communicate via a wireless body area network, a wireless personal area network, or some other type of wireless communication link. In some implementations the devices may communicate via one or more impulse-based ultra-wideband channels. Inter-pulse duty cycling may be employed to reduce the power consumption of a device. Power may be provided for the transmissions and receptions of pulses by charging and discharging a capacitive element according to the inter-pulse duty cycling. Sub-packet data may be transmitted and received via a common frequency band. A cell phone may multicast to two or more peripherals via wireless communication links.

64 Claims, 17 Drawing Sheets

U.S. PATENT DOCUMENTS

| | | | |
|---|---|---|---|
| 6,049,724 | A | 4/2000 | Rozenblit et al. |
| 6,091,374 | A | 7/2000 | Barnes |
| 6,097,973 | A | 8/2000 | Rabe et al. |
| 6,104,759 | A | 8/2000 | Carkner et al. |
| 6,111,536 | A | 8/2000 | Richards et al. |
| 6,111,538 | A | 8/2000 | Schuchman et al. |
| 6,133,876 | A | 10/2000 | Fullerton et al. |
| 6,163,259 | A | 12/2000 | Barsumian et al. |
| 6,177,903 | B1 | 1/2001 | Fullerton et al. |
| 6,218,979 | B1 | 4/2001 | Barnes et al. |
| 6,243,597 | B1 | 6/2001 | Daanen |
| 6,295,019 | B1 | 9/2001 | Richards et al. |
| 6,297,773 | B1 | 10/2001 | Fullerton et al. |
| 6,300,903 | B1 | 10/2001 | Richards et al. |
| 6,304,623 | B1 | 10/2001 | Richards et al. |
| 6,351,652 | B1 | 2/2002 | Finn et al. |
| 6,354,946 | B1 | 3/2002 | Finn |
| 6,400,307 | B2 | 6/2002 | Fullerton et al. |
| 6,400,329 | B1 | 6/2002 | Barnes |
| 6,405,027 | B1 | 6/2002 | Bell |
| 6,421,389 | B1 | 7/2002 | Jett et al. |
| 6,430,208 | B1 | 8/2002 | Fullerton et al. |
| 6,437,756 | B1 | 8/2002 | Schantz |
| 6,462,701 | B1 | 10/2002 | Finn |
| 6,466,125 | B1 | 10/2002 | Richards et al. |
| 6,469,628 | B1 | 10/2002 | Richards et al. |
| 6,483,461 | B1 | 11/2002 | Matheney et al. |
| 6,489,893 | B1 | 12/2002 | Richards et al. |
| 6,492,904 | B2 | 12/2002 | Richards |
| 6,492,906 | B1 | 12/2002 | Richards et al. |
| 6,501,393 | B1 | 12/2002 | Richards et al. |
| 6,504,483 | B1 | 1/2003 | Richards et al. |
| 6,512,455 | B2 | 1/2003 | Finn et al. |
| 6,512,488 | B2 | 1/2003 | Schantz |
| 6,519,464 | B1 | 2/2003 | Santhoff et al. |
| 6,529,568 | B1 | 3/2003 | Richards et al. |
| 6,538,615 | B1 | 3/2003 | Schantz |
| 6,539,213 | B1 | 3/2003 | Richards et al. |
| 6,549,567 | B1 | 4/2003 | Fullerton |
| 6,552,677 | B2 | 4/2003 | Barnes et al. |
| 6,556,621 | B1 | 4/2003 | Richards et al. |
| 6,560,463 | B1 | 5/2003 | Santhoff |
| 6,571,089 | B1 | 5/2003 | Richards et al. |
| 6,573,857 | B2 | 6/2003 | Fullerton et al. |
| 6,577,691 | B2 | 6/2003 | Richards et al. |
| 6,585,597 | B2 | 7/2003 | Finn |
| 6,593,886 | B2 | 7/2003 | Schantz |
| 6,606,051 | B1 | 8/2003 | Fullerton et al. |
| 6,611,234 | B2 | 8/2003 | Fullerton et al. |
| 6,614,384 | B2 | 9/2003 | Hall et al. |
| 6,621,462 | B2 | 9/2003 | Barnes |
| 6,636,566 | B1 | 10/2003 | Roberts et al. |
| 6,636,567 | B1 | 10/2003 | Roberts et al. |
| 6,636,573 | B2 | 10/2003 | Richards et al. |
| 6,642,903 | B2 | 11/2003 | Schantz |
| 6,661,342 | B2 | 12/2003 | Hall et al. |
| 6,667,724 | B2 | 12/2003 | Barnes et al. |
| 6,670,909 | B2 | 12/2003 | Kim |
| 6,671,310 | B1 | 12/2003 | Richards et al. |
| 6,674,396 | B2 | 1/2004 | Richards et al. |
| 6,677,796 | B2 | 1/2004 | Brethour et al. |
| 6,678,321 | B1 | 1/2004 | Graham et al. |
| 6,700,538 | B1 | 3/2004 | Richards |
| 6,701,188 | B2 | 3/2004 | Stroebel et al. |
| 6,710,736 | B2 | 3/2004 | Fullerton et al. |
| 6,717,992 | B2 | 4/2004 | Cowie et al. |
| 6,748,040 | B1 | 6/2004 | Johnson et al. |
| 6,750,757 | B1 | 6/2004 | Gabig, Jr. et al. |
| 6,759,948 | B2 | 7/2004 | Grisham et al. |
| 6,760,387 | B2 | 7/2004 | Langford et al. |
| 6,762,712 | B2 | 7/2004 | Kim |
| 6,763,057 | B1 | 7/2004 | Fullerton et al. |
| 6,763,282 | B2 | 7/2004 | Glenn et al. |
| 6,774,846 | B2 | 8/2004 | Fullerton et al. |
| 6,774,859 | B2 | 8/2004 | Schantz et al. |
| 6,778,603 | B1 | 8/2004 | Fullerton et al. |
| 6,781,530 | B2 | 8/2004 | Moore |
| 6,782,048 | B2 | 8/2004 | Santhoff |
| 6,788,730 | B1 | 9/2004 | Richards et al. |
| 6,801,611 | B2 | 10/2004 | Guccione et al. |
| 6,822,604 | B2 | 11/2004 | Hall et al. |
| 6,823,022 | B1 | 11/2004 | Fullerton et al. |
| 6,836,223 | B2 | 12/2004 | Moore |
| 6,836,226 | B2 | 12/2004 | Moore |
| 6,845,253 | B1 | 1/2005 | Schantz |
| 6,847,675 | B2 | 1/2005 | Fullerton et al. |
| 6,879,878 | B2 | 4/2005 | Glenn et al. |
| 6,882,301 | B2 | 4/2005 | Fullerton |
| 6,895,034 | B2 | 5/2005 | Nunally et al. |
| 6,900,732 | B2 | 5/2005 | Richards |
| 6,906,625 | B1 | 6/2005 | Taylor et al. |
| 6,907,244 | B2 | 6/2005 | Santhoff et al. |
| 6,912,240 | B2 | 6/2005 | Kumar et al. |
| 6,914,949 | B2 | 7/2005 | Richards et al. |
| 6,917,284 | B2 | 7/2005 | Grisham et al. |
| 6,919,838 | B2 | 7/2005 | Santhoff |
| 6,922,166 | B2 | 7/2005 | Richards et al. |
| 6,922,177 | B2 | 7/2005 | Barnes et al. |
| 6,925,109 | B2 | 8/2005 | Richards et al. |
| 6,933,882 | B2 | 8/2005 | Fullerton |
| 6,937,639 | B2 | 8/2005 | Pendergrass et al. |
| 6,937,663 | B2 | 8/2005 | Jett et al. |
| 6,937,667 | B1 | 8/2005 | Fullerton et al. |
| 6,937,674 | B2 | 8/2005 | Santhoff et al. |
| 6,947,492 | B2 | 9/2005 | Santhoff et al. |
| 6,950,485 | B2 | 9/2005 | Richards et al. |
| 6,954,480 | B2 | 10/2005 | Richards et al. |
| 6,959,031 | B2 | 10/2005 | Haynes et al. |
| 6,959,032 | B1 | 10/2005 | Richards et al. |
| 6,961,374 | B2 | 11/2005 | Chen |
| 6,963,727 | B2 | 11/2005 | Shreve |
| 6,963,747 | B1 * | 11/2005 | Elliott ........................... 455/450 |
| 6,980,613 | B2 | 12/2005 | Krivokapic |
| 6,989,751 | B2 | 1/2006 | Richards |
| 7,015,793 | B2 | 3/2006 | Gabig, Jr. et al. |
| 7,020,224 | B2 | 3/2006 | Krivokapic |
| 7,027,425 | B1 | 4/2006 | Fullerton et al. |
| 7,027,483 | B2 | 4/2006 | Santhoff et al. |
| 7,027,493 | B2 | 4/2006 | Richards |
| 7,030,806 | B2 | 4/2006 | Fullerton |
| 7,042,417 | B2 | 5/2006 | Santhoff et al. |
| 7,046,187 | B2 | 5/2006 | Fullerton et al. |
| 7,046,618 | B2 | 5/2006 | Santhoff et al. |
| 7,061,396 | B1 | 6/2006 | Conrad et al. |
| 7,069,111 | B2 | 6/2006 | Glenn et al. |
| 7,075,476 | B2 | 7/2006 | Kim |
| 7,079,827 | B2 | 7/2006 | Richards et al. |
| 7,099,367 | B2 | 8/2006 | Richards et al. |
| 7,099,368 | B2 | 8/2006 | Santhoff et al. |
| 7,129,886 | B2 | 10/2006 | Hall et al. |
| 7,132,975 | B2 | 11/2006 | Fullerton et al. |
| 7,145,954 | B1 | 12/2006 | Pendergrass et al. |
| 7,148,791 | B2 | 12/2006 | Grisham et al. |
| 7,151,490 | B2 | 12/2006 | Richards |
| 7,167,525 | B2 | 1/2007 | Santhoff et al. |
| 7,170,408 | B2 | 1/2007 | Taylor et al. |
| 7,184,938 | B1 | 2/2007 | Lansford et al. |
| 7,190,722 | B2 | 3/2007 | Lakkis et al. |
| 7,190,729 | B2 | 3/2007 | Siwiak |
| 7,190,972 | B1 * | 3/2007 | Hollister et al. ........... 455/556.1 |
| 7,206,334 | B2 | 4/2007 | Siwiak |
| 7,209,724 | B2 | 4/2007 | Richards et al. |
| 7,230,980 | B2 | 6/2007 | Langford et al. |
| 7,239,277 | B2 | 7/2007 | Fullerton et al. |
| RE39,759 | E | 8/2007 | Fullerton |
| 7,256,727 | B2 | 8/2007 | Fullerton et al. |
| 7,271,779 | B2 | 9/2007 | Hertel |
| 7,271,915 | B2 | 9/2007 | Molaskey et al. |
| 7,368,966 | B2 | 5/2008 | Hur |
| 7,378,939 | B2 | 5/2008 | Sengupta et al. |
| 7,383,038 | B2 | 6/2008 | Koenck et al. |
| 7,414,448 | B2 | 8/2008 | Huang et al. |
| 7,448,548 | B1 | 11/2008 | Compton |
| 7,511,614 | B2 | 3/2009 | Stilp et al. |
| 7,567,629 | B2 | 7/2009 | Fredriksson |
| 7,782,894 | B2 | 8/2010 | Oksanen et al. |
| 2001/0034475 | A1 | 10/2001 | Flach et al. |

| | | | |
|---|---|---|---|
| 2002/0150040 A1* | 10/2002 | Tong et al. | 370/216 |
| 2003/0118197 A1 | 6/2003 | Nagayasu et al. | |
| 2004/0032918 A1* | 2/2004 | Shor et al. | 375/345 |
| 2004/0046658 A1* | 3/2004 | Turner et al. | 340/539.11 |
| 2004/0151109 A1* | 8/2004 | Batra et al. | 370/208 |
| 2004/0176063 A1 | 9/2004 | Choi | |
| 2004/0219897 A1* | 11/2004 | Choi | 455/166.2 |
| 2004/0222865 A1* | 11/2004 | Romano et al. | 332/106 |
| 2005/0047444 A1 | 3/2005 | Park et al. | |
| 2005/0100079 A1* | 5/2005 | Sanada et al. | 375/141 |
| 2005/0100102 A1 | 5/2005 | Gazdzinski et al. | |
| 2005/0136839 A1 | 6/2005 | Seshadri et al. | |
| 2005/0185697 A1 | 8/2005 | Gargin | |
| 2005/0195883 A1 | 9/2005 | Choi et al. | |
| 2005/0238025 A1* | 10/2005 | Hay et al. | 370/395.1 |
| 2005/0282592 A1 | 12/2005 | Frerking et al. | |
| 2006/0039299 A1* | 2/2006 | Ihm et al. | 370/254 |
| 2006/0039448 A1* | 2/2006 | Ryckaert | 375/130 |
| 2006/0046658 A1 | 3/2006 | Cruz et al. | |
| 2006/0062278 A1 | 3/2006 | Ishii et al. | |
| 2006/0154665 A1 | 7/2006 | Svensson et al. | |
| 2007/0135058 A1* | 6/2007 | Ma et al. | 455/69 |
| 2007/0140317 A1 | 6/2007 | Birru | |
| 2007/0147475 A1 | 6/2007 | Yamamoto | |
| 2007/0195539 A1* | 8/2007 | Birnkrant | 362/458 |
| 2007/0258507 A1 | 11/2007 | Lee et al. | |
| 2007/0259629 A1 | 11/2007 | Lee et al. | |
| 2007/0259662 A1 | 11/2007 | Lee et al. | |
| 2007/0291834 A1 | 12/2007 | Toumazou et al. | |
| 2008/0122606 A1 | 5/2008 | Bradley | |
| 2009/0091400 A1 | 4/2009 | Orlik et al. | |
| 2009/0092058 A1 | 4/2009 | Beaulieu et al. | |
| 2010/0008401 A1 | 1/2010 | Beaulieu | |

FOREIGN PATENT DOCUMENTS

| | | |
|---|---|---|
| CN | 1574667 A | 2/2005 |
| EP | 0902547 | 3/1999 |
| EP | 0936757 A1 | 8/1999 |
| EP | 1475898 | 11/2004 |
| EP | 1619832 | 1/2005 |
| EP | 1562297 | 8/2005 |
| GB | 2332575 | 6/1999 |
| GB | 2401016 | 10/2004 |
| JP | 3062739 A | 3/1991 |
| JP | 4315320 | 11/1992 |
| JP | 9289458 A | 11/1997 |
| JP | 2002344635 A | 11/2002 |
| JP | 2003008467 | 1/2003 |
| JP | 2003101548 A | 4/2003 |
| JP | 2003515974 A | 5/2003 |
| JP | 2003516663 A | 5/2003 |
| JP | 2003198719 A | 7/2003 |
| JP | 3480761 B2 | 12/2003 |
| JP | 2004085545 A | 3/2004 |
| JP | 2004135350 A | 4/2004 |
| JP | 2004186726 | 7/2004 |
| JP | 2005020350 A | 1/2005 |
| JP | 2005094419 A | 4/2005 |
| JP | 2006020041 A | 1/2006 |
| JP | 2006050396 | 2/2006 |
| JP | 2006074679 | 3/2006 |
| JP | 2006507033 A | 3/2006 |
| JP | 2006519507 A | 8/2006 |
| JP | 2007504695 | 3/2007 |
| KR | 102002089631 | 11/2002 |
| WO | WO9916190 A1 | 4/1999 |
| WO | 9922536 | 5/1999 |
| WO | WO0143351 A2 | 6/2001 |
| WO | WO2004017547 A2 | 2/2004 |
| WO | 2004023637 | 3/2004 |
| WO | 2004073195 | 8/2004 |
| WO | 2004107678 | 12/2004 |
| WO | 2005013504 | 2/2005 |
| WO | WO2005020508 A1 | 3/2005 |
| WO | WO2005022846 A1 | 3/2005 |
| WO | WO2005031998 A1 | 4/2005 |
| WO | 2007121410 | 10/2007 |

OTHER PUBLICATIONS

International Preliminary Report on Patentability—PCT/US07/067572, International Search Authority, European Patent Office, Jul. 21, 2008.

International Search Report—PCT/US07/067572—International Search Authority—European Patent Office—Nov. 28, 2007.

Narayanaswami C et al: "Application design for a smart watch with a high resolution display" Wearable computers, The 4th International Symposium in Atlanta, GA, USA Oct. 16-17, 2000, Los Alamitos, CA, USA IEEE Comput. Soc, US, pp. 7-14, XP010525988.

Giannakis, G. B. et al.: "Ultra-wideband communications—An idea whose time has come," IEEE Signal Processing Magazine, IEEE Service Center, Piscataway, NJ, US, vol. 21, No. 6, (Nov. 1, 2004), pp. 26-54, XP011122123, ISSN: 1053-5888.

Gen Fujita et al., LSI Implementation of Wireless Data System Controller for Medical Cares, Report of the Institute of Electronics, Information and Communication Engineers, Japan, Jun. 11, 1999, vol. 99, No. 111, pp. 15-19, CAS99-32.

Hirohito Suda et al., Random Access and Intermittent Reception With Time Hopping, Collection of Lectures in General Meeting of the Institute of Electronics, Information and Communication Engineers 2003, Japan, Sep. 10, 2003, p. 581, B-5-204.

Intel Corporation: "Ultra-Wideband (UWB Technology) Enabling highspeed wireless personal area networks; White Paper", Jan. 1, 2005, pp. 1-8, XP55002870, USA Retrieved from the Internet. URL:http://www.intel.com/technology/comms/uwb/download/Ultra- Wideband.pdf [retrieved on Jul. 15, 2011].

Terada, Takahide, et al., "A CMOS UWB-IR Receiver Analog Front End With Intermittent Operation", Report of the Institute of Electronics, Information and Communication Engineers, Japan, Jul. 19, 2007, vol. 107, No. 163, pp. 65-70, ICD2007-48.

Ichikawa T., et al., "A Study on Multi-slot Access Protocol for PHS Packet Data System," Proceedings 1 of the 1996 Communications Society Conference of the Institute of Electronics, Information and Communication Engineers, Aug. 30, 1996, p. 457, B-456.

Nakache et al., Spectral Shaping of UWB Signals for Time-Hopping Impulse Radio, Apr. 2005, available at http://www.merl.com/papers/docs/TR2005-120.pdf, last visited Jul. 12, 2012.

Okada H., et al., "Performance Evaluation of Packet Combining and ARQ Schemes of Multiple Route Coding in Wireless Multihop Networks," Technical Report of the Institute of Electronics, Information and Communication Engineers, Feb. 22, 2006, vol. 105, No. 623, pp. 175-180, RCS2005-207.

Taiwan Search Report—TW096114798—TIPO—Mar. 24, 2012.

Asada, H., et al., "A Study on Code Division Duplex (CDD) for Distributed CDMA Networks", Technical Report of the Institute of Electronics, Information and Communication Engineers, Mar. 19, 1996, vol. 95, No. 591, pp. 89-94, SST95-145.

Erseghe, T., et al., Time hopping UWB: receiver design and performance of a full-duplex system, Networking with Ultra Wide Band and Workshop on Ultra Wide Band for Sensor Networks, 2005, Networking with UWB 2005, 2nd International Workshop, Jul. 4-6, 2005, pp. 30-34.

* cited by examiner

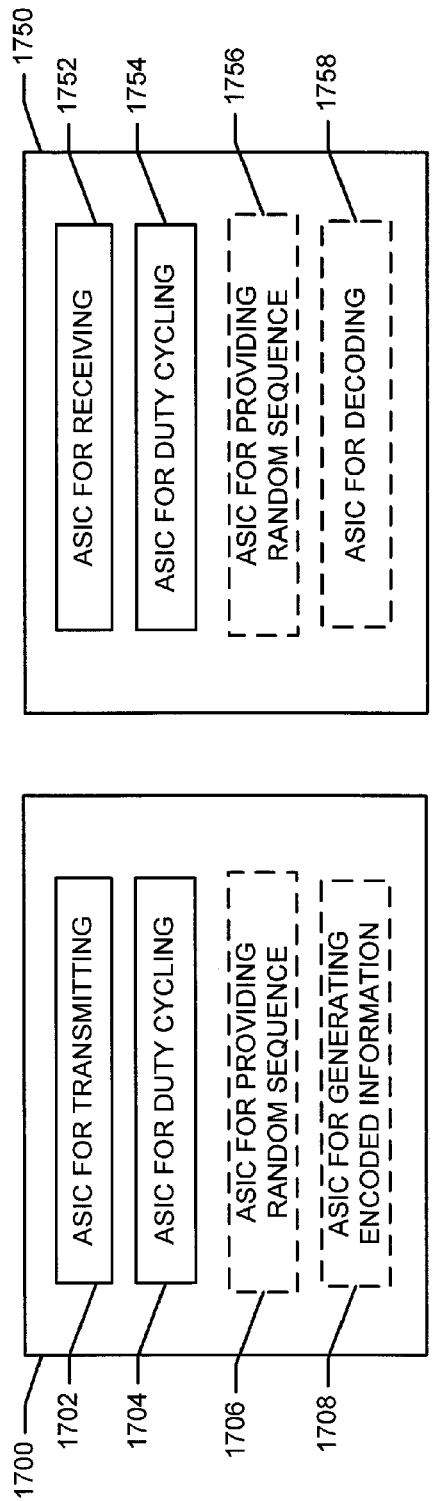
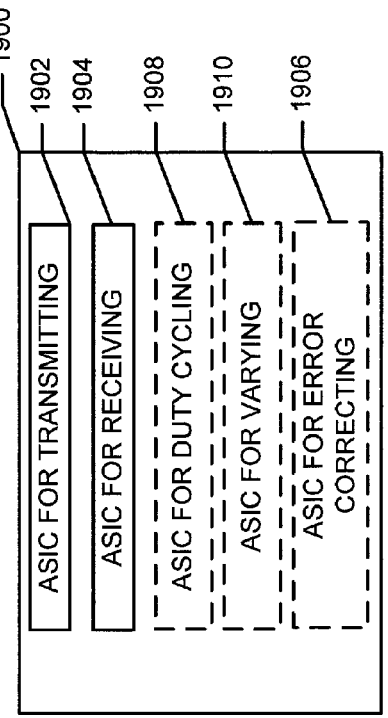
FIG. 17
FIG. 18
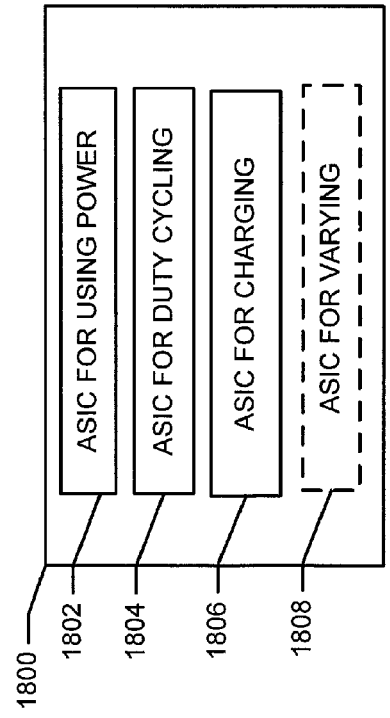
FIG. 19

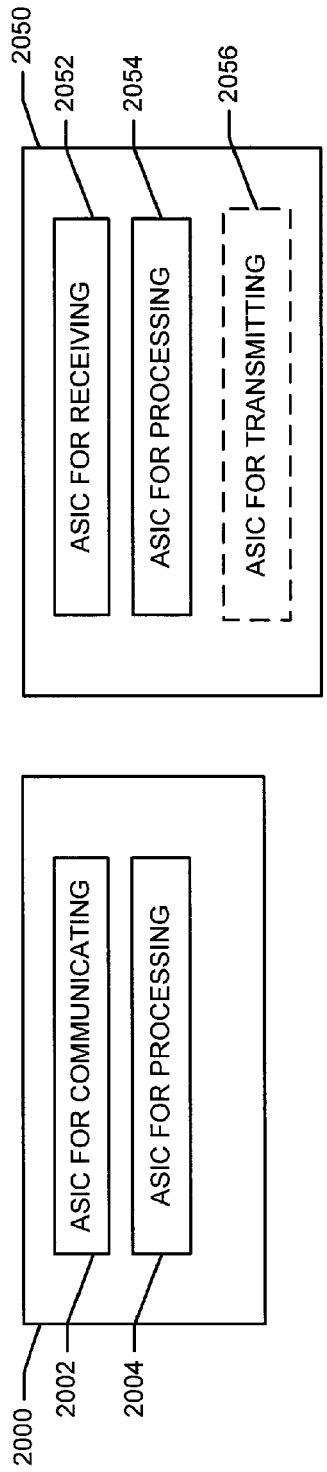
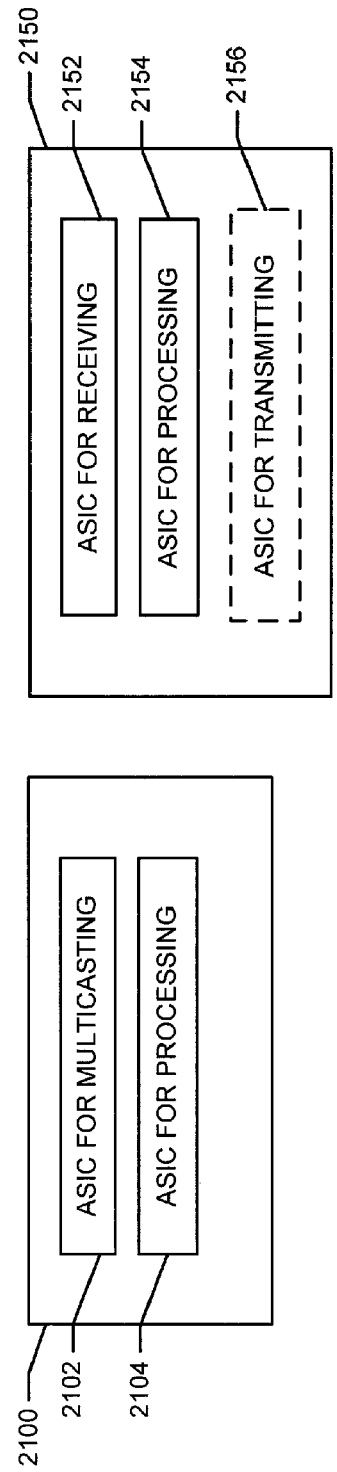
FIG. 20
FIG. 21

SUB-PACKET PULSE-BASED COMMUNICATIONS

CLAIM OF PRIORITY UNDER 35 U.S.C. §119

This application claims the benefit of and priority to commonly owned U.S. Provisional Patent Application No. 60/795,435, filed Apr. 26, 2006, and U.S. Provisional Patent Application No. 60/795,771, filed Apr. 28, 2006, the disclosure of each of which is hereby incorporated by reference herein.

CROSS-REFERENCE TO RELATED APPLICATION

This application is related to concurrently filed and commonly owned U.S. patent application entitled "INTER-PULSE DUTY CYCLING," and assigned Ser. No. 11/740,771; U.S. patent application entitled "DUTY CYCLING POWER SCHEME," and assigned Ser. No. 11/740,827; and U.S. patent application entitled "WIRELESS DEVICE COMMUNICATION WITH MULTIPLE PERIPHERALS," and assigned Ser. No. 11/740,681, the disclosure of each of which is hereby incorporated by reference herein.

BACKGROUND

1. Field

This application relates generally to wireless communication and, in various aspects, to inter-pulse duty cycling, a duty cycling power scheme, sub-packet communication, and wireless communication between a wireless device and multiple peripherals.

2. Background

Wireless communication systems may be designed to support various end uses. Here, one or more tradeoffs may be made in terms of coverage area, communication bandwidth, data transfer rate, ease of connectivity, power consumption, and other system parameters. For example, a cellular telephone network may be optimized to provide wireless coverage over a very wide area and provide ease of connectivity. In contrast, a wireless local area network such as a Wi-Fi network may be optimized to provide high speed connectivity, at the expense of the size of the wireless coverage area and perhaps the ease of connectivity. A wireless body area network or a wireless personal area, on the other hand, may be optimized to provide low power consumption, which may be achieved through the use of an even smaller wireless coverage area.

As an example of the latter form of network, a wireless personal area network may provide connectivity for devices in a home or a small office or may be used to provide connectivity for devices carried by a person. In a typical scenario, a wireless personal area network may provide connectivity for devices within a range on the order of 30 meters. In some applications, one or more of the devices that make up a wireless personal area network may be portable devices. For example, a cell phone may communicate with a headset via a wireless personal area network such as Bluetooth.

In general, it is desirable to reduce the power consumption of such portable devices. For example, a device that consumes less power may utilize a smaller battery or may require less frequent battery recharges or battery replacements. In the former scenario, the device may potentially be manufactured in a smaller form factor and at a lower cost. In the latter case, the device may be more convenient for a user to use or may provide a lower overall cost of ownership.

Some personal area networks such as Bluetooth (e.g., IEEE 802.15.1) and Zigbee (e.g., based on IEEE 802.15.4) may employ power-down strategies to reduce the overall power consumption of a device. For example, after a device transmits or receives a packet, the device may power down certain portions of the device (e.g., the radio) for a certain period of time. Here, on the transmit side the device may remain in a low power state until there is another packet to send. Conversely, on the receive side the device may awake from a low power state at regular intervals to determine whether another device is attempting to transmit data.

It also may be desirable to employ low power devices in certain body area network applications. In a typical configuration, a body area network may provide connectivity between devices that are worn or carried by a person, or are incorporated into or placed within a vehicle, a room or some other relatively smaller area. Thus, a body area network may provide a wireless coverage area on the order of 10 meters in some implementations. In some applications the devices that make up a body area network may be portable devices or may preferably be relatively low maintenance devices. Consequently, devices that consume relatively small amounts of power may be advantageously employed in these and other types of applications.

SUMMARY

A summary of sample aspects of the disclosure follows. It should be understood that any reference to aspects herein may refer to one or more aspects of the disclosure.

The disclosure relates in some aspects to low power wireless communication techniques for devices that communicate via a wireless body area network, a wireless personal area network, or some other type of wireless communication link. In some aspects the communication may comprise ultra-wideband communication. For example, the signaling over the network or link may have a bandwidth on the order of 500 MHz or more.

The disclosure relates in some aspects to impulse-based communication. In some implementations the corresponding signaling pulses may comprise ultra-wideband pulses. For example, in some implementations the duration of each transmitted pulse may be on the order of 1 nanosecond or less. In some implementations the pulses also may be generated with a relatively low duty cycle. That is, the pulse repetition period may be relatively long with respect to the duration of the pulses.

The disclosure relates in some aspects to inter-pulse duty cycling. Here, duty cycling refers to reducing the power consumed by a device in some manner in between the transmission of pulses, the reception of pulses, or both (e.g., between successive transmit and receive pulses). In some implementations power consumption is reduced by disabling (e.g., turning off power to) one or more radio circuits (e.g., a portion of a component, an entire component, several components) of the device. In some implementations power consumption is reduced by reducing a frequency of a clock signal for one or more radio circuits of the device.

In some aspects the pulses may be generated according to variable inter-pulse time durations. For example, the pulse repetition period may be varied such that different sets of pulses may be separated by different time durations. In some implementations the inter-pulse time durations may be varied according to a time hopping sequence.

In some aspects the pulse repetition period may be dynamically dependent on the data encoding. For example, the pulse repetition rate associated with a channel may be adjusted to correspond to any change in the data rate of data output by a variable rate encoder (e.g., a source encoder or a channel encoder). Consequently, the powered-on time for inter-pulse duty cycling also may be dependent on the coding scheme. For example, a decrease in the data rate of the data from the encoder may enable the use of a lower duty cycle for the transmitted pulses.

The disclosure relates in some aspects to charging and discharging a capacitive element according to the inter-pulse duty cycling. For example, the capacitive element may be charged when pulses are not being transmitted or received, and then discharged to power the device when pulses are being transmitted or received. In this way, the peak current consumption from the battery of the device during the powered-on times of the inter-pulse duty cycling may be better matched to the average current draw from the battery of the device.

The disclosure relates in some aspects to coexisting transmission and reception of sub-packet data over a common frequency band. For example, after the transmission of one or more pulses that comprise at least a portion of a packet, one or more pulses associated with a portion of another packet are received via the same frequency band. This reception of pulses is then followed by transmission, via the same frequency band, of one or more pulses that comprise at least a portion of a packet.

The disclosure relates in some aspects to communication between a wireless device (e.g., a cell phone) and two or more peripherals (e.g., headsets). In some aspects a wireless device may multicast to two or more peripherals via one or more wireless communication links. In some aspects a peripheral may multicast to two or more devices (e.g., a wireless device and another peripheral) via one or more wireless communication links. In some aspects this multicasting involves coexisting transmission and reception of multicast-related sub-packet traffic via a common frequency band.

BRIEF DESCRIPTION OF THE DRAWINGS

These and other features, aspects and advantages of the disclosure will be more fully understood when considered with respect to the following detailed description, appended claims and accompanying drawings, wherein:

FIG. 14, including

FIGS. 16-21 are simplified block diagrams of several sample aspects of several wireless apparatuses.

Figure 1:
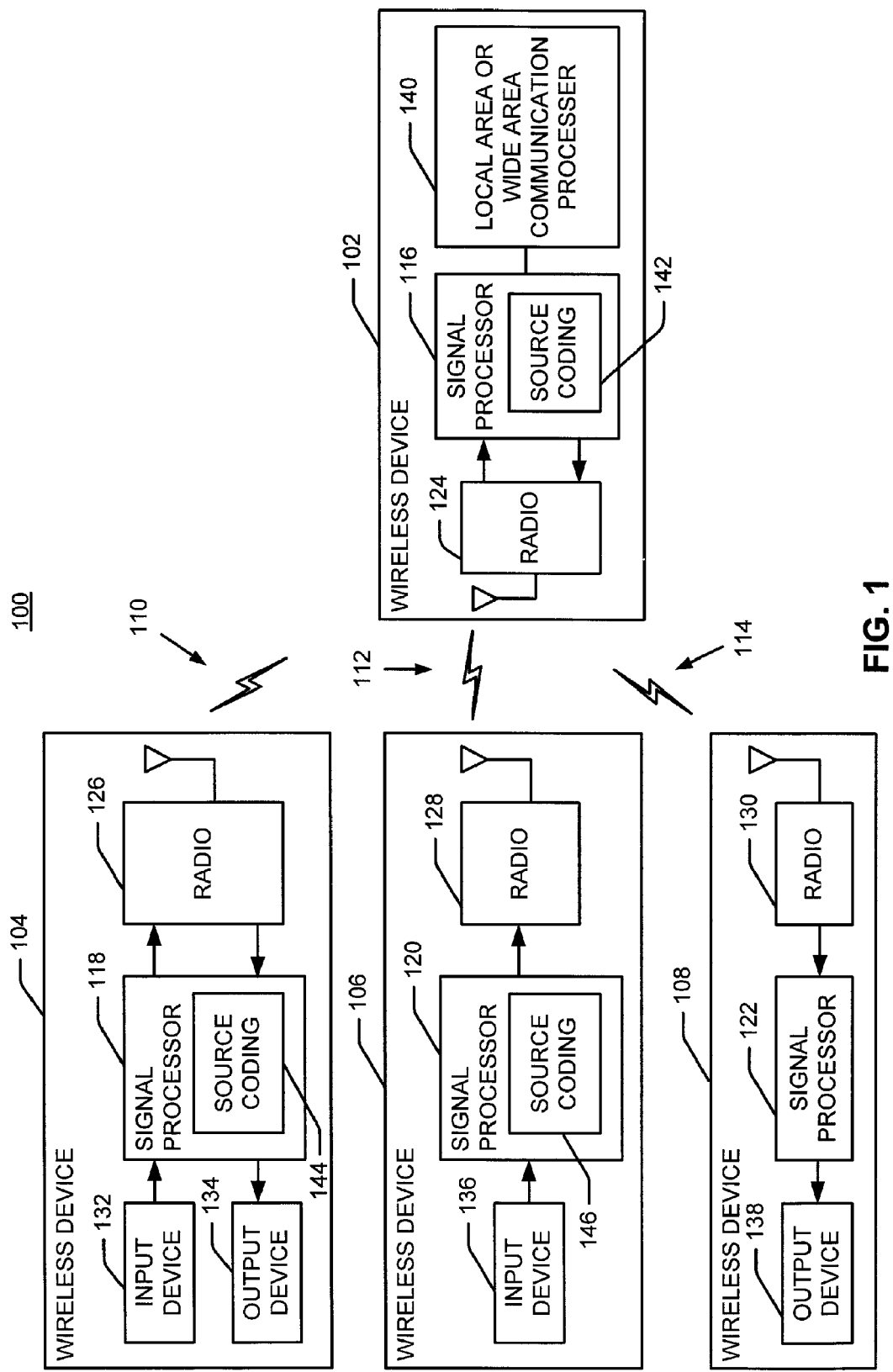
FIG. 1 is a simplified block diagram of several sample aspects of a wireless communication system.

In accordance with common practice the various features illustrated in the drawings may not be drawn to scale. Accordingly, the dimensions of the various features may be arbitrarily expanded or reduced for clarity. In addition, some of the drawings may be simplified for clarity. Thus, the drawings may not depict all of the components of a given apparatus (e.g., device) or method. Finally, like reference numerals may be used to denote like features throughout the specification and figures.

DETAILED DESCRIPTION

Various aspects of the disclosure are described below. It should be apparent that the teachings herein may be embodied in a wide variety of forms and that any specific structure, function, or both being disclosed herein is merely representative. Based on the teachings herein one skilled in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. For example, in some aspects a method of providing pulses comprises generating encoded information, transmitting pulses based on the encoded information, and duty cycling between the transmissions of the pulses. In addition, in some aspects this method of providing pulses also comprises adapting timing of the transmission of pulses based on variable rate encoding.

FIG. 1 illustrates sample aspects of a system 100 including several wireless communication devices 102, 104, 106, and 108 that are adapted to communicate with one another via one or more wireless communication links (e.g., communication links 110, 112, and 114). Each of the devices 102, 104, 106, and 108 respectively includes one or more signal processors 116, 118, 120, and 122 and an RF radio component 124, 126, 128, and 130 (e.g., a wireless transceiver) to establish wireless communication with the other devices.

In some implementations the devices 102, 104, 106, and 108 may form at least a portion of a wireless body area network or a personal area network. For example, the device 102 may comprise a wireless station such as a cell phone, a personal data assistant, or a personal entertainment device (e.g., a music or video player). In some implementations the devices 104, 106, and 108 may comprise peripheral devices for the device 102. For example, the device 104 may comprise a headset including one or more input devices 132 (e.g., a microphone) and one or more output devices 134 (e.g., a speaker). The device 106 may comprise a medical device including one or more input devices 136 (e.g., a sensor such as a heartbeat sensor). The device 108 may comprise a watch including one or more output devices 138 (e.g., a display). It should be appreciated that in other implementations the devices 102, 104, 106, and 108 may comprises other types of devices and may communicate via other types of wireless communication links (e.g., networks).

The devices 102, 104, 106, and 108 may send various types of data to one another and, in some cases, to other devices (not shown in FIG. 1). For example, the device 104 may generate or forward data (e.g., multimedia information or messages) to be output by the device 104 or the device 108. Similarly, the device 106 may generate data (e.g., heart rate information) to be output by any one of the devices 102, 104, and 108. Here, multimedia information may comprise, for example, audio, video, images, data, or some combination of two or more of these types of information.

The device 102 may communicate with other devices via one or more other communication links (not shown). For example, the device 102 may include a local area or wide area communication processor 140 that is adapted to establish communication with, for example, a wired or wireless access point (e.g., a base station) that is associated with or provides connectivity to another network (e.g., a cellular network, the Internet, and so on). Thus, data generated by any of the devices 102, 104, or 106 may be sent to some other device (e.g., a phone or computer attached to another network). Similarly, the other device may provide data to be output by any of the devices 102, 104, or 108.

As will be discussed in more detail below, the signal processors 116, 118, and 120 may provide appropriate source coding-related functionality 142, 144, and 146, respectively, for processing data that is to be transmitted to or was received from another device. For example, such source coding may involve variable rate coding, waveform coding, pulse code modulation encoding, signal delta modulation encoding, or some type of coding.

In some implementations the devices 102, 104, 106, and 108 may communicate via an impulse-based physical layer. In some aspects the physical layer may utilize ultra-wide band pulses that have a relatively short length (e.g., on the order of a few nanoseconds or less) and a relatively wide bandwidth. For example, an ultra-wideband pulse may have a fractional bandwidth on the order of 20% or more, have a bandwidth on the order of 500 MHz or more, or both.

Figure 2:
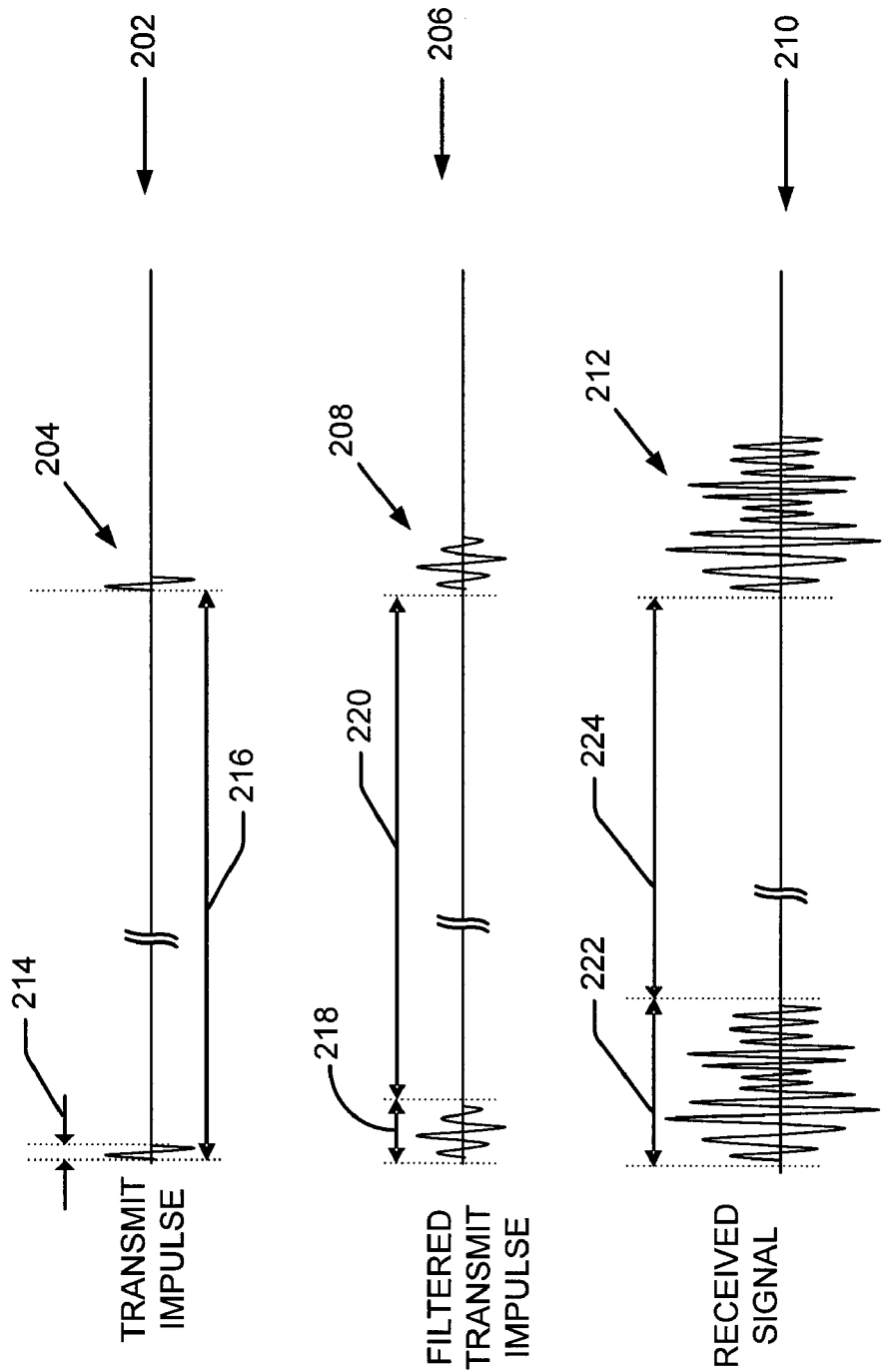
FIG. 2 is a simplified diagram of several sample pulse waveforms.

FIG. 2 illustrates a simplified example of several pulse waveforms that may be generated based on, for example, information from the encoders of FIG. 1. A waveform 202 depicts a series of pulses 204 to be transmitted. A waveform 206 depicts pulses 208 that correspond to the pulses 204 as they may appear after passing through a bandpass filter, but before transmission. A waveform 210 depicts pulses 212 that correspond to the pulses 208 as they may appear at a receiver after transmission through a communication medium. Here, the pulses 212 may be relatively wide due to multipath delay spread that occurs as the pulses 208 pass through the communication medium to the receiver.

The pulses 204 are modulated based on the encoded data to be transmitted to another device. Modulation of the pulses 204 may take various forms including, for example, phase modulation and pulse position modulation. In addition, in some implementations pulses may be transmitted in a transmitted reference format (not shown).

In some aspects impulse-based ultra-wideband signaling may be used at very low spectral efficiencies to provide ultra-low-power communication. In particular, in the modulation form of FIG. 2 the impulses are separated by relatively large periods of time. For example, the duration 214 of each pulse 204 may be less than 1 nanosecond (e.g., 100 picoseconds) while the pulse repetition interval 216 may be on the order of 100 nanoseconds to 10 microseconds. In such a case, circuits (e.g., the radio front ends) of the corresponding transmitter and receiver may be duty cycled such that they are powered on only when needed to transmit or receive pulses and are powered off the remainder of the time.

As an example, a data rate on the order of 10 Mbits per second may be supported using 1.5 GHz of bandwidth by sending or receiving a pulse every 100 nanoseconds. In an example where the duration of each pulse 208 is on the order of 1 nanosecond, a corresponding transmitter may be powered on less than one percent of the time. That is, the transmitter may be powered on during the time period 218 and turned off during the time period represented by the line 220.

In addition, in an example where the duration 222 of each received pulse 212 is on the order of 10 to 20 nanoseconds, the corresponding receiver may be on for less than 10 percent of the time. Here, the receiver may be powered on during the time period 222 and turned off during the time period represented by the line 224.

Through the use of inter-pulse duty cycling as illustrated in FIG. 2, a reduction in power consumption may be achieved because circuits associated the transmitter and receiver that consume relatively significant amounts of power may be powered on only when the device is actually transmitting or receiving. In contrast, conventional approaches such as Bluetooth and Zigbee rely on macroscopic duty cycling at the packet level in an attempt to achieve relatively low average power consumption. That is, in these approaches the transmitter and receiver circuits may be powered on for the transmission or reception of the entire packet, thereby wasting considerable power as compared to the inter-pulse duty cycling technique taught herein.

The use of low duty cycle impulse-based signaling and inter-pulse duty cycling may be advantageously employed in conjunction with various other features. For example, in some aspects the inter-pulse time durations may be varied over time. For example, some implementations may employ time hopping of the pulses, whereby the transmission times of the pulses are randomly dithered to facilitate multiple access and an ergodic processing gain. In some aspects the pulse repetition rate of the impulse-based signal may be adjusted in accordance with the current data rate of data provided by a variable rate encoder. In some aspects the peak current consumption of the device during the powered-on times of the inter-pulse duty cycling may be better matched to the average current draw of the device. Here, a capacitive element is charged during the powered-off times of the inter-pulse duty cycling and discharged during the powered-on times to provide power to transmit and receive pulses. In some aspects impulse-based signaling may be used to provide effectively concurrent transmission and reception of sub-packet data via a common frequency band. In some aspects, a wireless device may wirelessly multicast with several peripherals. These and other aspects and potential advantages of impulse-based signaling as taught herein will now be described in more detail in conjunction with FIGS. 3-15.

Figure 3:
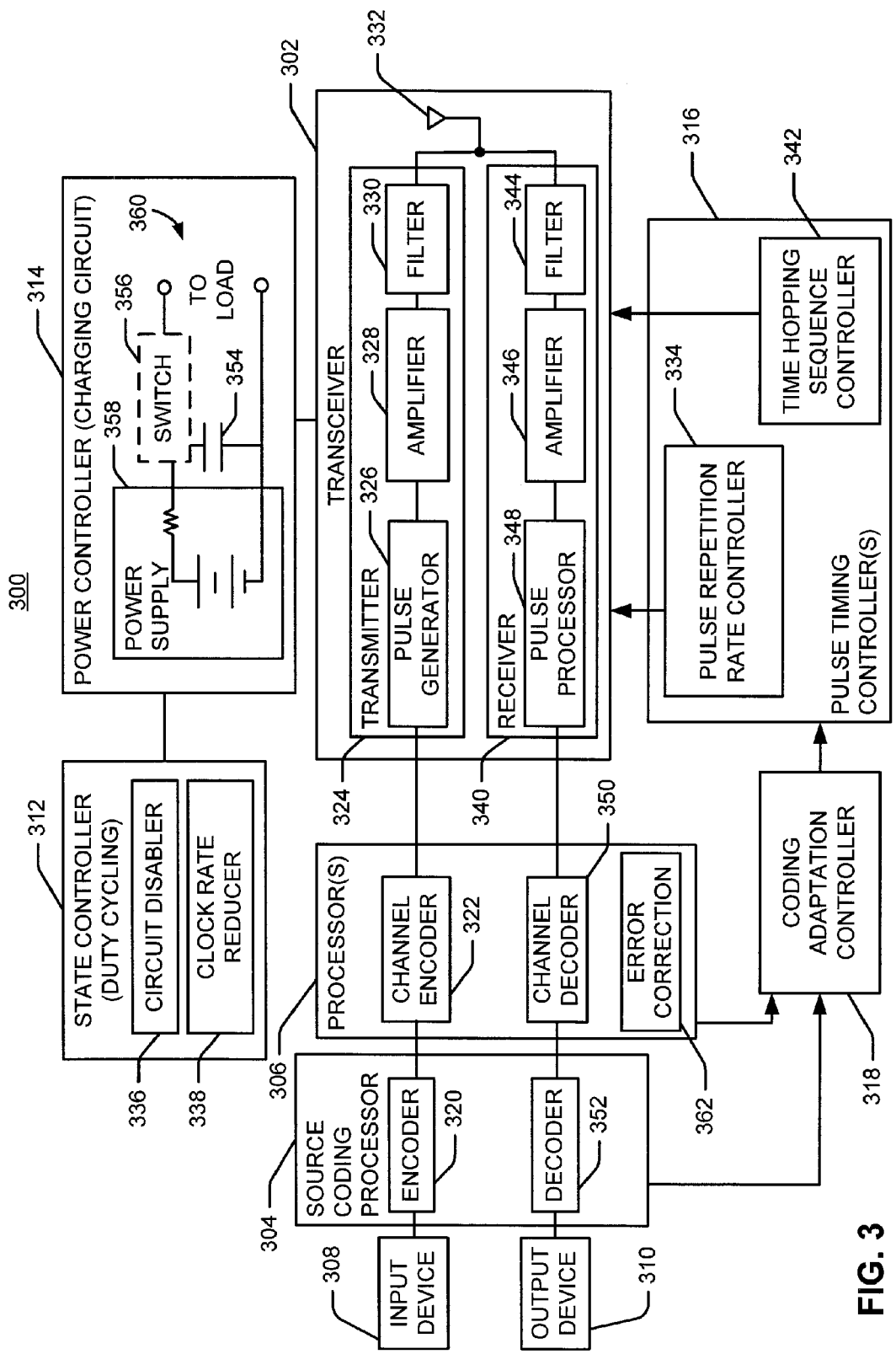
FIG. 3 is a simplified block diagram of several sample aspects of a wireless device.

FIG. 3 illustrates a simplified example of an apparatus 300 that may, for example, implement at least a portion of the functionality of one or more of the wireless devices of FIG. 1. The apparatus 300 includes a transceiver 302 (e.g., similar to the radios of FIG. 1) for generating impulse-based signals for transmission and processing received impulse-based signals. The apparatus also includes one or more processors 304 and 306 (e.g., similar to a signal processor of FIG. 1) for processing data to be transmitted or for processing received data. In addition, the apparatus 300 includes one or more input devices 308 and output devices 310 that may be similar to the corresponding devices of FIG. 1. As will be discussed in more detail below, the apparatus 300 also may include a state controller 312 for facilitating inter-pulse duty cycling, a power controller 314 including a charging circuit for providing power for transmission and reception of pulses, one or more pulse timing controllers 316 for controlling the relative timing of the pulses (e.g., the inter-pulse time duration), and a coding adaptation controller 318 for adapting the inter-pulse time duration (e.g., the pulse repetition rate) in accordance with a coding scheme (e.g., a source coding scheme or a channel coding scheme).

Sample operations of the apparatus 300 will now be discussed in more detail in conjunction with the flowcharts of FIGS. 4-8, 10, and 12. For convenience, the operations of these figures (or any other operations discussed or taught herein) may be described as being performed by specific components. It should be appreciated, however, that these operations may be performed by other types of components and may be performed using a different number of components. It also should be appreciated that one or more of the operations described herein may not be employed in a given implementation.

Figure 4:
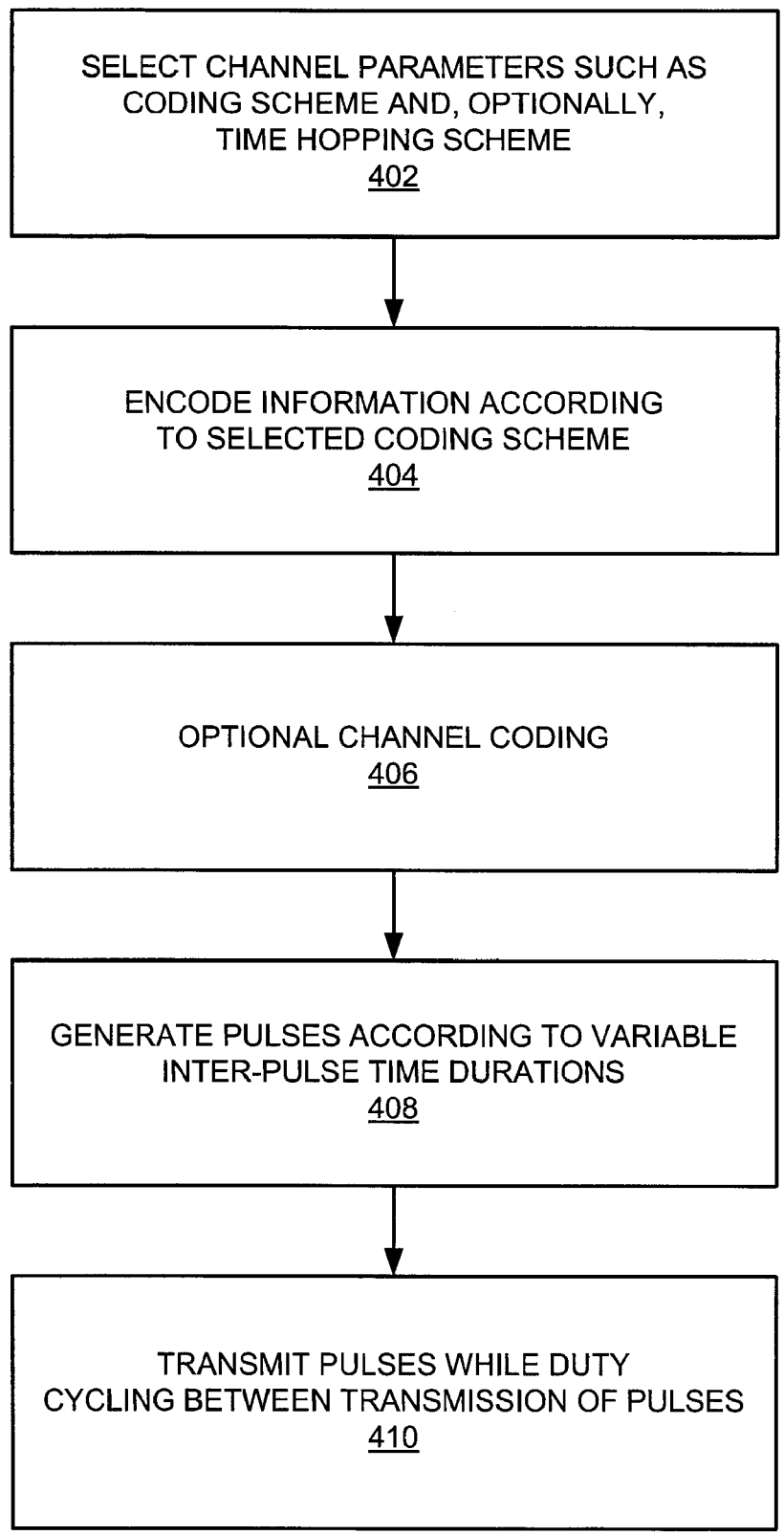
FIG. 4 is a flowchart of several sample aspects of operations that may be performed to transmit pulses.
Figure 5:
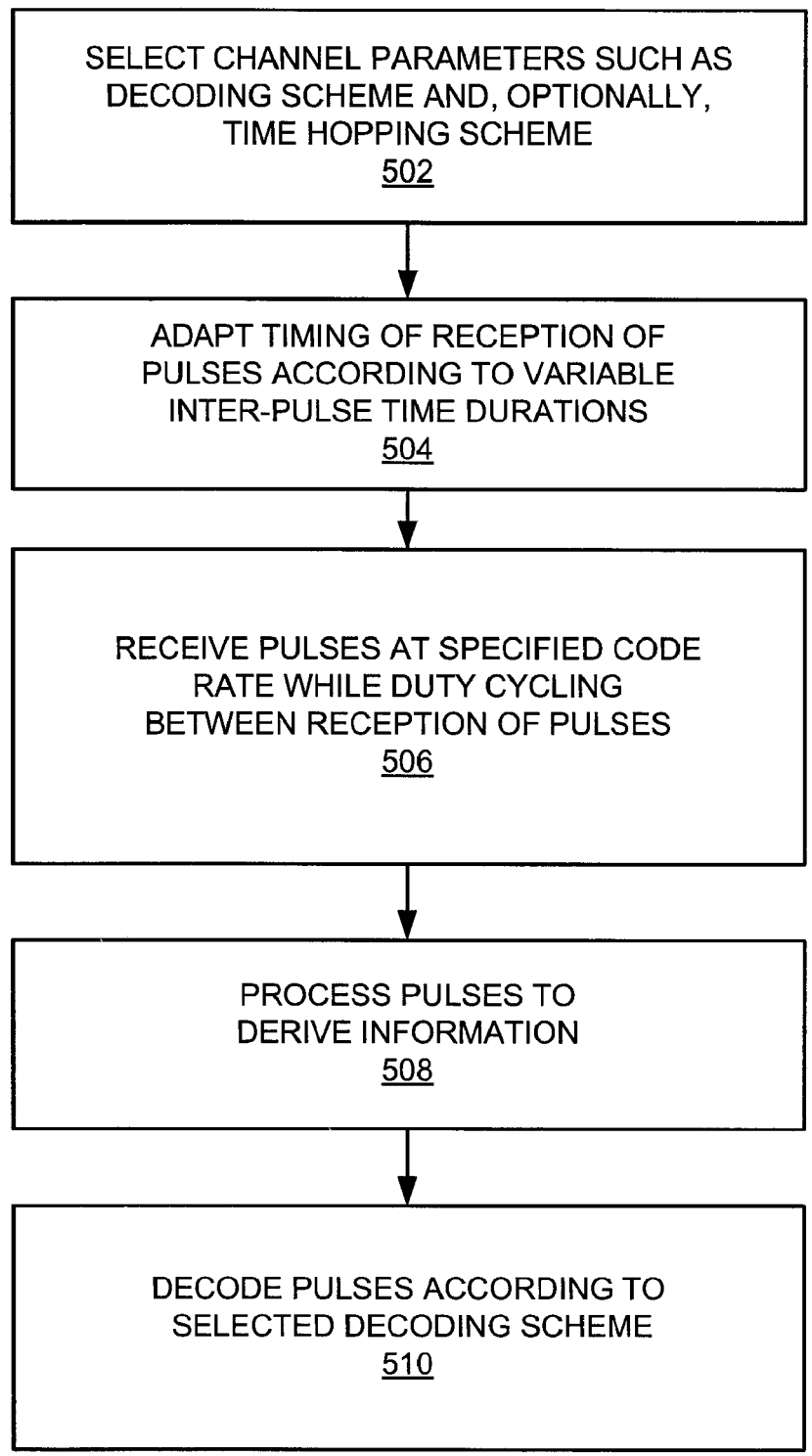
FIG. 5 is a flowchart of several sample aspects of operations that may be performed to receive pulses.

FIGS. 4 and 5 illustrate several sample operations that may be performed in conjunction with the transmission and reception of impulse-based signals, respectively. Blocks 402 and 502 relate to operations that may be performed, for example, to establish a communication channel between a transmitter and a receiver. Hence, these operations may be part of an association procedure or some other similar procedure.

The operations of blocks 402 and 502 may involve selecting various communication parameters relating to transceiver operations (e.g., performed by the processors 304 and 306) that facilitate the transmission and reception of signals over the channel. Such operations may include on the transmit side, for example, source coding, MAC packetizing and formatting, channel coding, interleaving, and scrambling. Complementary operations such as descrambling, deinterleaving, channel decoding, removal of MAC framing, and source decoding may be performed on the receive side.

The operations of blocks 402 and 502 also may involve selecting parameters relating to the generation of the pulses. For example, a particular pulse repetition rate may be selected for the channel. In addition, in some implementations a set of timeslots may be defined for time hopping the pulses. In this case, blocks 402 and 502 may involve selecting a time hopping sequence that defines the particular timeslot within which each successive pulse will appear. For example, in some implementations a random or pseudo-random sequence may be generated and provided to the transceiver 302.

Referring now to the transmission operations of FIG. 4, after the input device 308 or some other component of the apparatus 300 provides information (data) to be transmitted, one or more processors 304 and 306 process the information for transmission (block 404). In the example of FIG. 3, an encoder 320 may source encode the information from the device 308. In some implementations source coding relates to converting an analog waveform to a digital waveform to facilitate transmitting the information over the channel. Thus, source encoding may comprise, for example, waveform encoding, pulse code modulation encoding, or sigma delta modulation encoding. In some implementations a source coder 320 may comprise a lossless/lossy encoder.

The processor 306 may perform other transmission-related operations such as those discussed above in conjunction with block 402. As represented by block 406, in some implementations the apparatus 300 may include a channel encoder 322 that implements a channel coding scheme whereby multiple pulses are used to represent each bit of the information to be transmitted. An example of a coding scheme is described in more detail below in conjunction with FIG. 15.

The encoded information is then provided to a transmitter 324 that generates and transmits modulated pulses. As represented by block 408 a pulse generator 326 generates pulses based on (e.g., modulated by) the encoded information. Here, some implementations may use non-coherent modulation techniques such as, for example, pulse position modulation or on/off keying. In contrast, some implementations may use a coherent modulation approach such as, for example, a transmitted reference technique. Such modulation techniques may facilitate transmission using an impulse generator that is followed by a passive bandpass filter. In this case, the transmitter may only be turned on for the active duration of the pulse. As discussed herein, such a pulse may have a duration on the order of several nanoseconds or less than a nanosecond.

The actual position in time of each generated pulse may depend on the selected pulse repetition rate, a time hopping sequence, or some other parameter or parameters (block 410). In some aspects the pulses are generated according to variable inter-pulse time durations. For example, the variable inter-pulse time durations may be based on a variable pulse repetition period, time hopping, or variable coding. Accordingly, the pulse generator 326 may generate pulses based on control signals received from a pulse repetition rate controller 334 and a time hopping sequence controller 342. As discussed below in conjunction with FIG. 6, in some implementations the pulse repetition rate may be dynamically adapted based on the source or channel coding. The pulses generated by the pulse generator 324 are provided to a power amplifier 328 and a bandpass filter 330, and then transmitted via an antenna 332.

Figure 6:
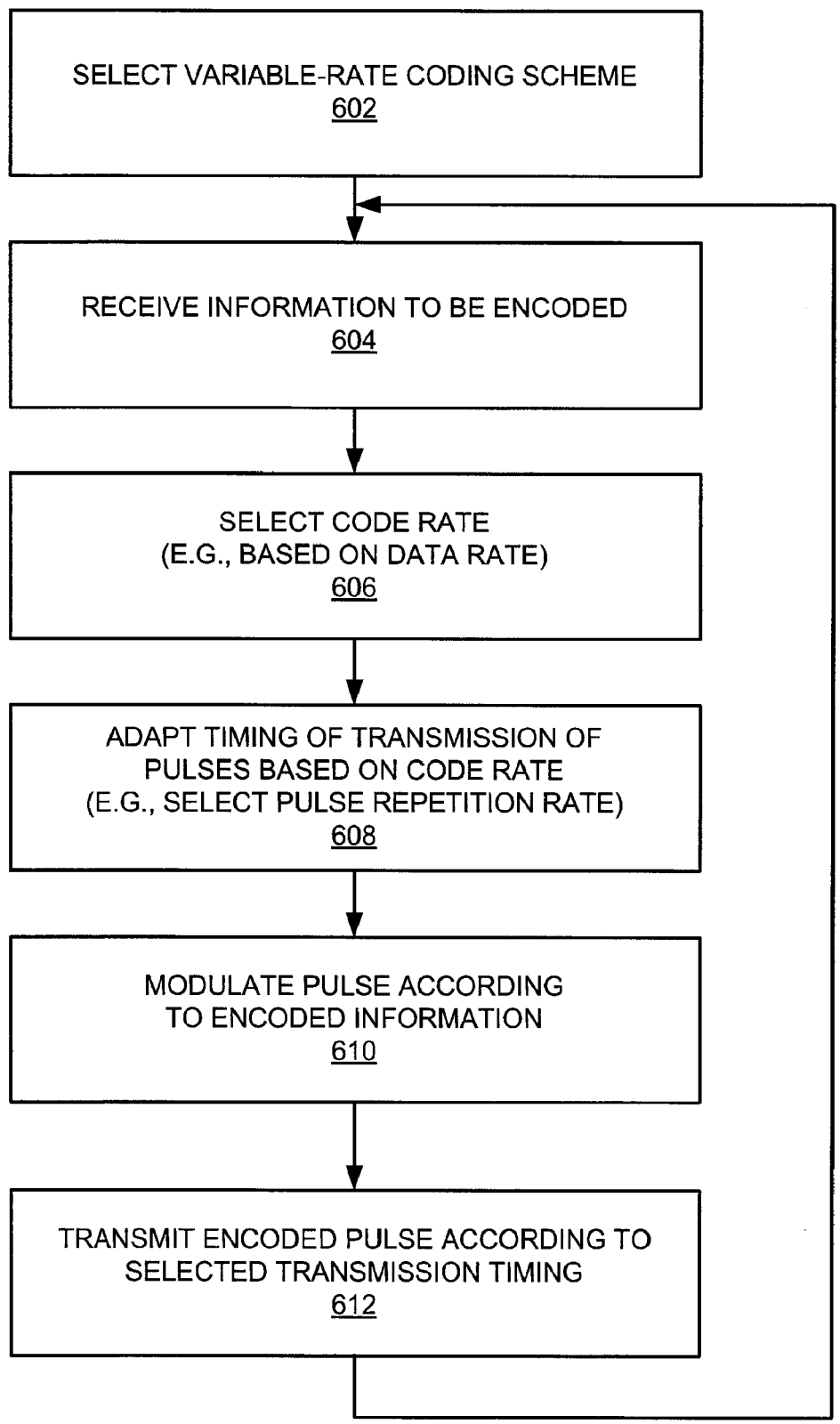
FIG. 6 is a flowchart of several sample aspects of operations that may be performed to adapt the transmission of pulses to a variable coding rate.

Referring to FIG. 6, in some implementations the encoder 320, the encoder 322, or both, may comprise a variable-rate encoder. In such a case the encoders 320 or 322 may output data at a rate that varies depending upon the content of the input to the encoders 320 or 322. As an example, the encoder 320 may comprise a variable-rate voice encoder (vocoder) that encodes voice waveforms received from the input device 308 (e.g., a microphone). Here, in the event the voice waveforms relate to continuous speech over a given period of time the encoder 320 may output data at a full rate (e.g., 16K samples per second) for that period of time. In contrast, in the event the voice waveforms relate to intermittent speech over another period of time the encoder 320 may switch to output data at a half rate (e.g., 8K samples per second) for that period of time.

Accordingly, at block 602 in FIG. 6 an appropriate variable-rate coding scheme is initially selected. This operation may be performed, for example, during an association procedure as described above in conjunction with blocks 402 and 502.

As represented by block 604, the encoder 320 receives information to be encoded from the input device 308. The encoder 320 may then select an appropriate code rate (e.g., full rate, half rate, etc.) based on the content of the received information (block 606). For example, the coding rate may be based on the average data rate of the incoming information over a defined period of time. Similar operations may then be performed in conjunction with blocks 604 and 606 for the channel encoder 322.

As represented by block 608, the coding adaptation controller 318 may then adapt the timing of the transmission of pulses based on the code rate or rates. As an example, when the encoder 320 outputs data at a full rate, the pulse repetition rate for the pulses may be defined to output a pulse every 200 nanoseconds. In contrast, when the encoder 320 outputs data at a half rate, the pulse repetition rate for the pulses may be defined to output a pulse every 400 nanoseconds. To this end, the controller 318 may control the pulse repetition rate controller 334 that defines the pulse repetition rate for the pulse generator 326. Similar adaptations may be made at block 608 in conjunction with the channel encoder 322.

In a similar manner as discussed above in conjunction with FIG. 4, the transmitter 324 generates modulated pulses in accordance with the encoded information at block 610. Then, at block 612, the transmitter 324 transmits the encoded information according to the selected transmission timing (e.g., the variable inter-pulse time durations).

Figure 7:
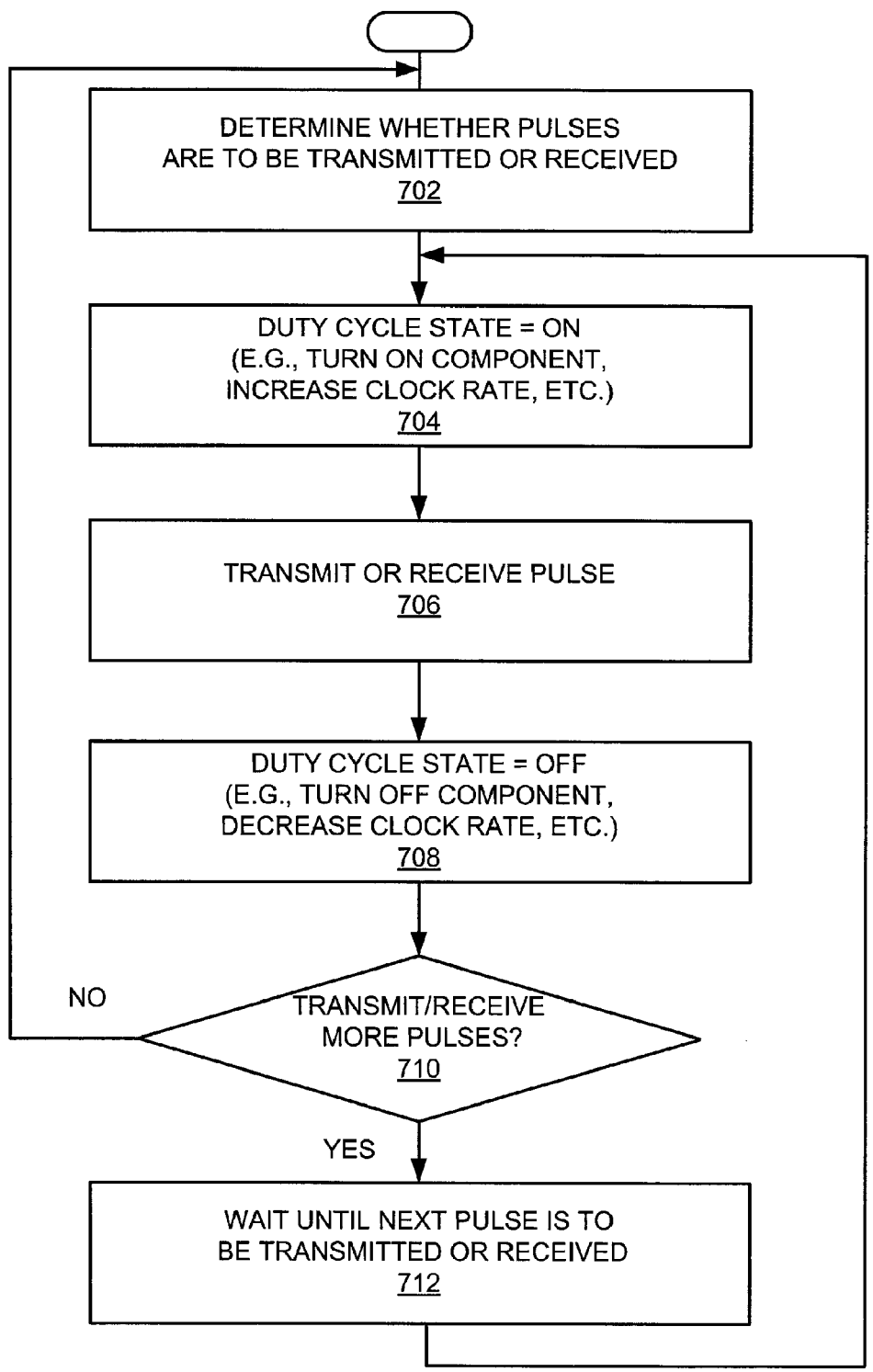
FIG. 7 is a flowchart of several sample aspects of operations that may be performed to provide inter-pulse duty cycling.

Referring now to FIG. 7, the transmission (and as will be discussed below the reception) of the pulses also may involve inter-pulse duty cycling. To this end, the state controller 312 may control one or more circuits of the apparatus 300 to reduce the power consumption of the apparatus 300 when pulses are not being transmitted or received. In a typical implementation, circuits associated with the RF front end of the transceiver 302 may be turned off when the transceiver 302 is not transmitting or receiving pulses. Such circuits may include, for example, a low noise amplifier, a voltage controlled oscillator, a detector, a mixer, a gain buffer, a current converter, a squarer, an integrator, a power amplifier, and so on. In some cases several of these circuits may be turned off or otherwise disabled. In general, such circuits may consume a relatively significant amount of power as compared to other circuits of the apparatus (most of which are not depicted in FIG. 3).

In some implementations the state controller 312 may comprise a circuit disabler component 336 that temporarily disables one or more circuits of the apparatus 300. For example, the circuit disabler 336 may cut off power to one or more circuits (e.g., analog components) or may send a signal to a circuit that causes the circuit to, for example, disable certain functionality. In the former case, the circuit disabler 336 may cooperate with a power controller 314 that may selectively provide power to one or more of the circuits of the apparatus 300.

In some implementations the state controller 312 may comprise a clock rate reducer component 338. The clock rate reducer 338 may adjust the clock rate of one or more clock signals that drive one or more circuits of the apparatus 300. Here, adjusting the clock rate may involve decreasing the frequency of a clock signal that drives several digital circuits of the transceiver 324. In this way, the power consumed by the circuit or circuits may be reduced as a result of the decrease in the clock rate. In some cases, the rate of the clock may be decreased to zero Hz (i.e., the clock is turned off)

Referring to the operations of FIG. 7, as represented by block 702 the state controller 312 may cooperate with another component of the apparatus 300 to determine whether pulses are to be transmitted or received. For example, the processors 304 and 306, the transceiver 302, or the pulse timing controller 316 may provide an indication to the state controller 312 immediately before a pulse is to be output by the transceiver 302.

As represented by block 704, the state controller may then set the inter-pulse duty cycle state to a powered-on state. Consequently, the state controller 312 may thereby enable any previously disabled circuits (e.g., turn on the power to the circuits) or return all of the clocks to their normal clock rate. In the example of FIG. 2, the transmit side operations of block 704 may coincide with the beginning of the time period 218.

As represented by block 706, the transmitter 324 may then generate and transmit the pulse as discussed herein. Thus, in the example of FIG. 2 a pulse 208 may be generated and provided to the antenna 332.

As represented by block 708, after the pulse is transmitted the state controller 312 switches the inter-pulse duty cycle state back to the powered-off state. The circuit disabler 336 may thus disable the appropriate circuits and/or the clock rate reducer 338 may reduce the frequency of one or more clocks as discussed above. In the example of FIG. 2 the transmit side operations of block 708 may coincide with the end of the time period 218

As represented by blocks 710 and 712, the apparatus 300 is maintained in the powered off-state until another pulse needs to be transmitted (or as discussed below, until a pulse needs to be received). In the event pulses are being transmitted at the pulse repetition rate (e.g., there is currently data to be transmitted) the duration of the powered-off state may correspond to the time period 220 between the pulses 208 in the example of FIG. 2. In contrast, if there is no data to be transmitted, the apparatus 300 may remain in the powered-off state until another pulse is to be transmitted. The operations of FIG. 7 may thus be repeated as necessary whenever pulses need to be transmitted.

On the receive side, the apparatus 300 performs operations that are complementary to those described above in conjunction with FIGS. 4 and 7. These operations will now be discussed in more detail in conjunction with FIG. 5.

As discussed above, at block 502 various parameters are specified for communication over the channel. These parameters may include, for example, a pulse repetition rate, a time hopping sequence if applicable, and whether the pulse timing may be adapted based on variable rate coding.

As represented by block 504, if applicable, the timing of the reception of the pulses may be adapted based on the code rate. This may involve, for example, receiving an indication that the data being transmitted or to be transmitted is associated with a particular code rate.

As represented by block 506, the receiver 340 receives incoming pulses via the antenna 332. The received pulses are provided to a bandpass filter 344 and then to a low noise amplifier 346. A pulse processor 348 may then process the pulses, as necessary, to extract (e.g., demodulate) the information represented by the pulses (block 508). As discussed above, the pulses may be received according to variable inter-pulse time durations.

In some implementations that utilize non-coherent modulation, the receiver 340 may incorporate a loosely locked VCO for down-conversion. Here, the VCO may be turned off between impulses (e.g., during the powered-off state discussed herein). In some implementations such a VCO may not utilize a phase locked loop. Here, the non-coherence may make the demodulation relatively insensitive to phase or frequency differences from one pulse to the next.

In some implementations the receiver 340 may employ a super-regenerative front end that may function as a sub-sampling receiver. Here, the super-regenerative front end may sample the received signal for short period of time (e.g., on the order of a few picoseconds), reusing the single gain stage. The super-regenerative front end may then be followed by an energy detection stage.

Referring again to FIG. 5, at block 510 the received information is processed by the processors 304 and 306 to provide data for the output device 310. To this end, the processor 306 may comprise a channel decoder 350 that performs channel decoding operations. In some implementations the channel decoding operation may be similar to those that are discussed below in conjunction with FIG. 15. In addition, the processor 304 may comprise a source decoder 352. Complementary to the operation as discussed above, the source decoder 352 may, for example, convert waveform encoded data or sigma delta modulated data to analog data for output by the output device 310. In addition, the channel decoder 350, the source decoder 352, or both, may comprise a variable-rate decoder.

As mentioned above, inter-pulse duty cycling also may be employed in conjunction with the reception of pulses. Referring again to FIG. 7, as represented by block 702 the state controller 312 may cooperate with another component of the apparatus 300 to determine whether a pulse is to be received. For example, the processors 304 and 306, the transceiver 302, or the pulse timing controller 316 may provide an indication to the state controller 312 immediately before the expected receipt of a pulse by the transceiver 302. Here, the expected time of receipt of a pulse may be based on the current pulse repetition rate, the current time hopping sequence if applicable, the current coding rate, defined pulse scanning intervals defined for the receiver 340, or some other criterion or criteria.

As represented by block 704, in the event a pulse is expected, the state controller 312 may set the inter-pulse duty cycle state to a powered-on state. In the example of FIG. 2 the operations of block 704 for the receive side may coincide with the beginning of the time period 222.

As represented by block 706, the receiver 340 may then process the received pulse as discussed herein. In the example of FIG. 2 the received pulse is represented by the pulse 212.

As represented by block 708, after the pulse has been received the state controller 312 switches the inter-pulse duty cycle state back to the powered-off state. In the example of FIG. 2 the receive side operations of block 708 may coincide with the end of the time period 222.

As represented by blocks 710 and 712, the apparatus 300 is maintained in the powered off-state until another pulse is to be received (or as discussed below, until a pulse needs to be transmitted). In the event pulses are being received at the pulse repetition rate (e.g., there is currently data to be received) the duration of the powered-off state may correspond to the time period 224 between the pulses 212 in the example of FIG. 2. In contrast, if there is no data to be transmitted, the apparatus 300 may remain in the powered off state until another pulse needs to be received. The operations of FIG. 7 may thus be repeated as necessary whenever pulses are to be received.

It should be appreciated that the operations of FIG. 7 are also applicable to the case where a pulse is transmitted after which a pulse is received, or vice versa. For example, the inter-pulse duty cycle state may be set to powered-on during transmission of a pulse, then set to powered-off after the transmission, and then reset to powered-on when a pulse is received.

Figure 8:
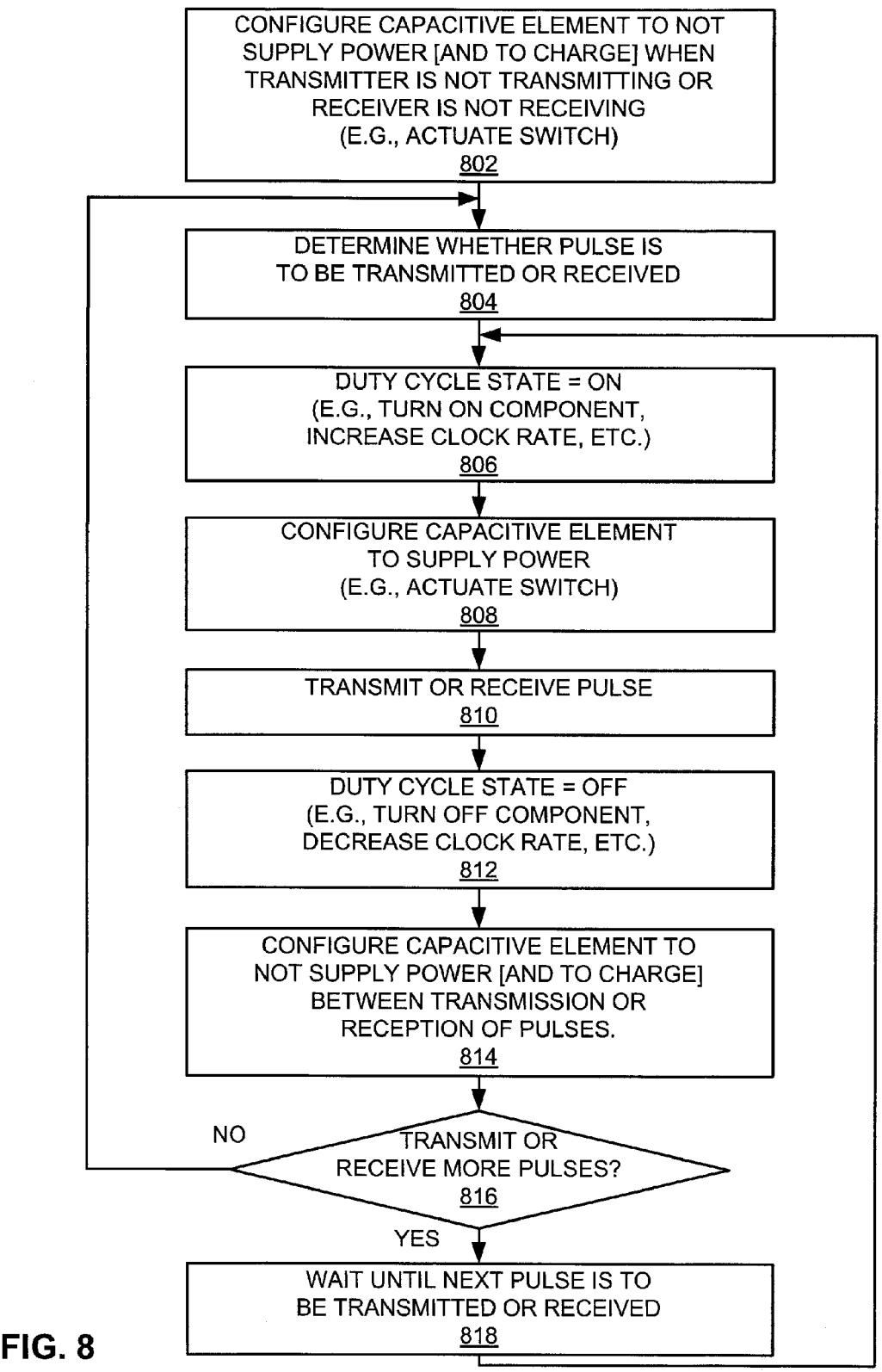
FIG. 8 is a flowchart of several sample aspects of operations that may be performed to provide power from a capacitive element during a powered-on state.
Figure 9:
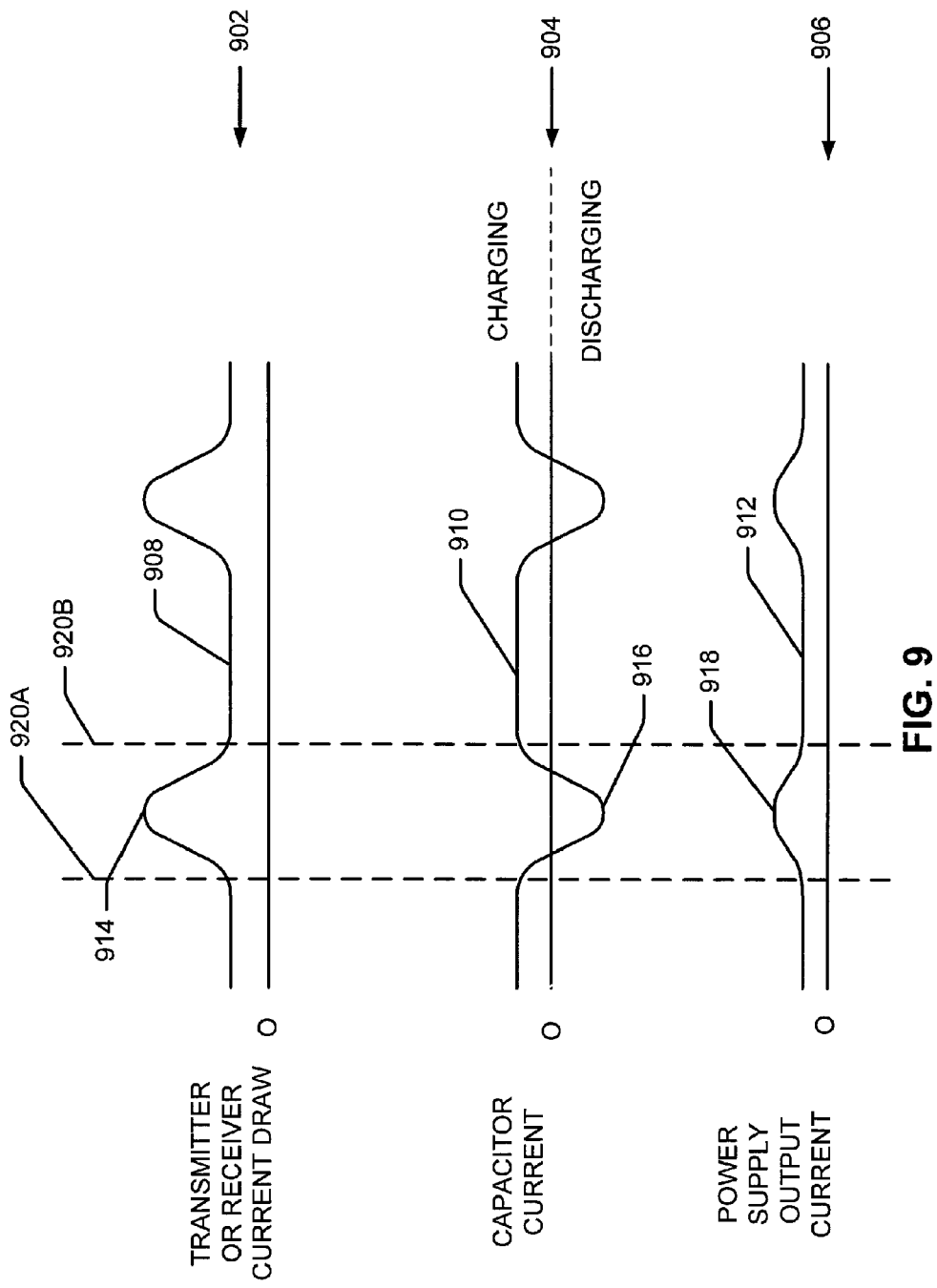
FIG. 9 is a simplified diagram of several sample current flow waveforms.

Referring now to FIGS. 8 and 9, in some implementations a capacitive element may be selectively charged and discharged in accordance with the inter-pulse duty cycling to efficiently provide power for pulse processing. For example, the capacitive element may initially be charged when the transceiver 302 is not transmitting or receiving pulses. Then, when the transceiver 302 is transmitting or receiving pulses the capacitive element may be discharged to provide power to one or more circuits that facilitate the transmission and reception of the pulses. Such circuits may include, for example, circuits of the transmitter 324 such as the power amplifier 328 and circuits of the receiver 340 such as the low noise amplifier 346.

In some implementations the power controller 314 of FIG. 3 may comprise a charging circuit that is adapted to selectively charge and discharge a capacitive element 354. In some aspects the charging circuit may comprise one or more switches 356 for selectively coupling the capacitive element 354 to a power supply 358 (e.g., a battery), a load 360 (e.g., one or more transmitter or receiver circuits), or both. In some implementations, during transmission and reception of pulses, power may be supplied to the load 360 from both the capacitive element 354 and the power supply 358. Hence, the charging circuit may be configured (e.g., the switch or switches 356 actuated) in a manner that facilitates providing power from multiple sources to one or more circuits.

Referring now to the operations of FIG. 8, as represented by block 802 the charging circuit may initially be configured so that the capacitive element 354 does not supply power to the load 360 when the transmitter 324 is not transmitting pulses and the receiver 340 is not receiving pulses. In addition, the charging circuit may initially be configured so that the capacitive element 354 is charging for at least a portion of at this time. In FIG. 2 this scenario may coincide with the time periods 220 and 224 (e.g., the power-off state of the state controller 312).

As represented by block 804, at some point in time the apparatus 300 determines that a pulse needs to be transmitted or received. As a result, the apparatus 300 may change the duty cycle state to the powered-on state (block 806). The apparatus 300 may perform these operations, for example, as discussed above in conjunction with FIG. 7.

As represented by block 808, the charging circuit may then provide power to the designated circuits during the transmission or reception of pulses (block 810). For example, in some implementations the switch(es) 356 may decouple the capacitive element 354 from being charged by the power supply 358 and couple the capacitive element 354 to provide current to the load 360. It should be appreciated that a variety of circuits may be used to couple the capacitive element 354 to power supply 358 and to the load 360 to accomplish this operation or other similar operations.

FIG. 9 depicts several waveforms that serve to illustrate relative current draws between the states of blocks 802 and 808. A waveform 902 illustrates an example of current draw at the transmitter 324 or the receiver 340. A waveform 904 illustrates charge current (top half of the waveform) and discharge current (bottom half of the waveform) for the capacitive element 354. A waveform 906 illustrates an example of current draw from the power supply 358. It should be appreciated that the waveforms of FIG. 9 are presented in a simplified manner to highlight the basic concepts herein. In practice, the actual current flows may differ significantly from those shown in the figure.

Levels 908, 910, and 912 relate to current flow during a powered-off state. In this case, the transmitter 324 or the receiver 340 may be drawing a relatively small amount of current as represented by the level 908. In addition, the capacitive element 354 may be charging at this time as represented by the level 910. Also, the power supply may be providing a relatively average amount of power to the apparatus 300 as represented by the level 912.

The levels 914, 916, and 918 relate to current flow during a powered-on state that corresponds to a period of time between the dashed lines 920A and 920B. In this case, the transmitter 324 or the receiver 340 may be drawing a relatively significant amount of current as represented by the raised portion of the waveform 914. The capacitive element 354 may thus be discharging at this time as represented by a dipped portion of the waveform 916. That is, current stored on the capacitive element 354 during a powered-off state may now be provided to the transmitter 324 or the receiver 340. In addition, the power supply 358 also may be providing additional output current to the transmitter 324 or the receiver 340 as represented by the waveform portion 918.

It should be appreciated that the operation of the capacitive element 354 may serve to reduce the amount of peak power supplied by the power supply 358. For example, a battery may operate less efficiently at peak power levels (e.g., resulting in a disproportionately shorter lifetime). Accordingly, the operation of the capacitive element 354 may reduce the overall power consumption of the apparatus 300 by reducing the peak current load on the power supply 358.

The charging circuit may be implemented in various ways to provide an appropriate amount of power during the powered-on state. For example, in some implementations a sufficient charge is placed on the capacitive element 354 during the powered-off state to enable the power supply 358 to supply, during transmission or reception of one or more pulses, an amount of current that is not substantially more than the average current drawn from the power supply 358. In some implementations the amount of current referred to above is at most 20% more than the average current drawn from the power supply 358. It should be appreciated that other percentages or amounts may be employed in other implementations.

In some implementations a sufficient charge is placed on the capacitive element 354 during a powered-off state to enable the power supply 358 to supply, during transmission or reception of one or more pulses, an amount of current that is substantially less than a peak current associated with the transmission or reception of one or more pulses. Here, the peak current may comprise, for example, the current drawn by the transmitter 324 during transmission or the receiver 342 during reception. In some implementations the amount of current referred to above is at least 20 percent less than the peak current. It should be appreciated that other percentages or amounts may be employed in other implementations.

Referring again to FIG. 8, after the pulses are transmitted or received, the duty cycle state may be set back to the powered-off state (block 812). Accordingly, as represented by block 814 the capacitive element may be reconfigured to charge and to not supply power as discussed above in conjunction with block 802. As represented by blocks 816 and 818 the above operations may be repeated, as necessary, to charge and discharge the capacitive element 354 in accordance with the inter-pulse duty cycling. Here, it should be appreciated that the above techniques also apply in the event the transceiver operations switch between the transmission and reception of pulses. For example, after a pulse is transmitted the capacitive element may charge during the powered-off state, and then be discharged during a subsequent receive operation.

Figure 10:
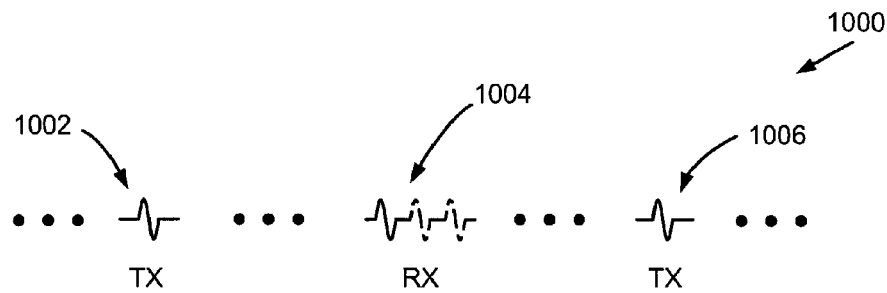
FIG. 10 is a simplified diagram of a sample pulse waveform illustrating sequential transmission and reception of pulses over a common frequency band.
Figure 11:
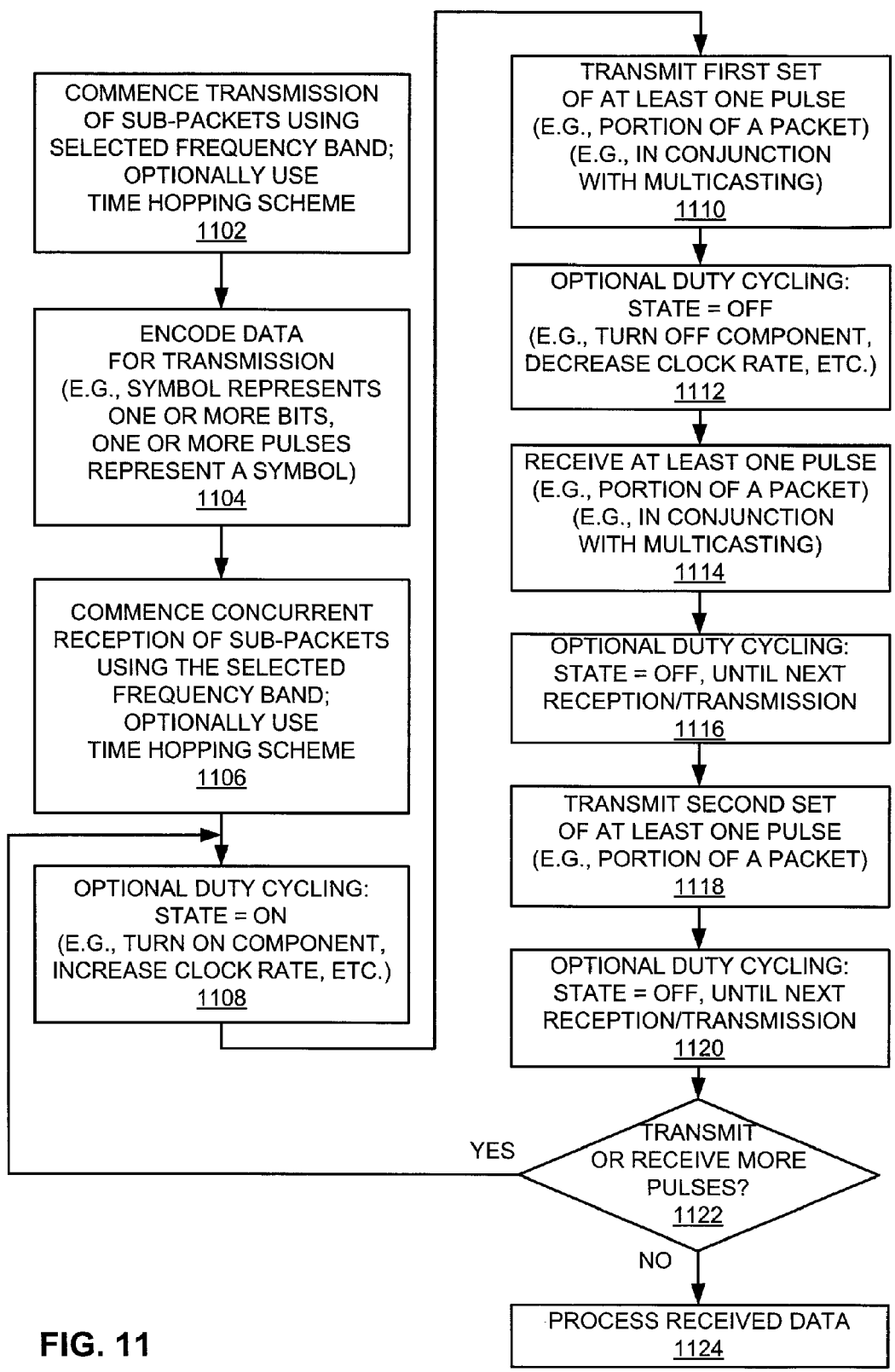
FIG. 11 is a flowchart of several sample aspects of operations that may be performed to transmit and receive sub-packets over a common frequency band.
Figure 12:
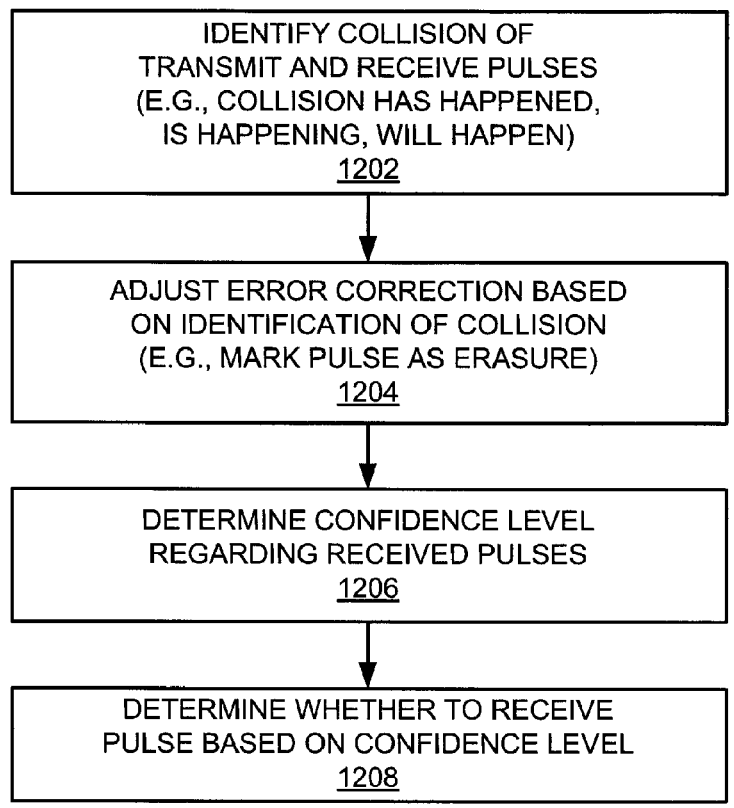
FIG. 12 is a flowchart of several sample aspects of operations that may be performed to account for pulse collisions.
Figure 14B:
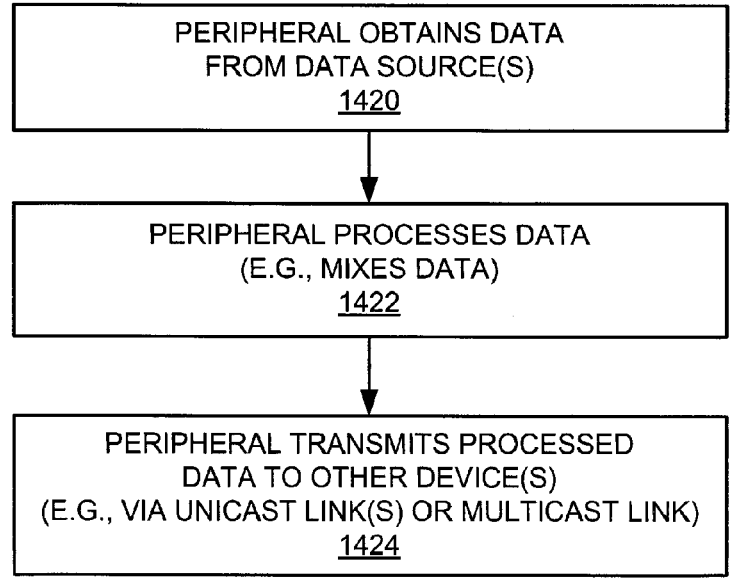
FIGS. 14A and 14B, are flowcharts of several sample aspects of operations that may be performed to provide a multicast session.

Referring now to FIGS. 10, 11, and 12, the disclosure also relates in some aspects to using impulse-based signaling to transmit and receive portions of packets over a common frequency band in a substantially concurrent manner. Here, packets may comprise sets of data that are repeatedly delineated in some manner for transmission. For example, a packet may be defined by a formal protocol header, a preamble, or some other suitable delineation technique.

FIG. 10 illustrates a series of pulses 1000 generated within a given frequency band as they may appear over a given period of time. During the first portion of the time period one or more pulses may be transmitted. FIG. 10 illustrates the last transmitted pulse 1002 from the first portion of the time period. During a later portion of the time period one or more pulses 1004 may be received. Then, during an even later portion of the time period one or more pulses may again be transmitted. FIG. 10 illustrates the first transmitted pulse 1006 from the latest portion of the time period. The ellipses of FIG. 10 illustrate that additional sets of pulses may be transmitted and received over time.

Here, one or more of the sets of pulses 1002, 1004, and 1006 may comprise a portion of the packet. That is, a packet to be transmitted may be divided up into different portions and each portion of the packet may be transmitted as a set of one or more pulses. Similarly, a packet to be received may have been divided up into different portions by a remote transmitter whereby the remote transmitter transmits each portion of its packet as a set of one or more pulses. As illustrated in FIG. 10, the transmission and reception of these different sets of pulses associated with different sub-packets may be interspersed in time over a given time period (e.g., by alternately transmitting and receiving portions of the packets). For example, alternately transmitting a pulse of a packet, receiving a pulse of a different packet, transmitting the next pulse of the first packet, and so forth. From a macro scale it appears that the transceiver is transmitting and receiving a packet simultaneously in the same frequency band.

The particular grouping of sets of pulses (e.g., as illustrated in FIG. 10) may depend on various factors. For example, in some applications, rather than transmit a relatively large pulse that may negatively impact peak power requirements, it may be desirable to instead represent that information as a series of smaller pulses that are transmitted in succession. In addition, the transmit pulses may be transmitted at a different pulse repetition rate than the receive pulses, or vice versa. This may be the result of, for example, a different data rate or a different processing gain. In some implementations the number of pulses transmitted in succession may be on the order of 100 pulses or less or the maximum duration of a set of pulses (e.g., transmit pulses) may be on the order of 20 microseconds or less. In addition, to maintain a sufficiently low duty cycle (e.g., as discussed above in conjunction with FIG. 2), in some implementations the duration of a given pulse may be 20 nanoseconds or less.

In some implementations the transmit pulses 1002 and 1006 may be transmitted via one defined code channel within the defined frequency band and the received pulses 1004 received via another defined code channel within the same frequency band. Here, these different code channels may be defined by different pulse repetition periods, different time hopping sequences, different scrambling codes, different modulation schemes, some other parameter, or some combination of two or more of these parameters.

In some implementations the pulses transmitted and received by a given device (e.g., as shown in FIG. 10) may be destined for one or more other devices and received from one or more other devices. For example, the sets of transmitted pulses may be associated with a multicast stream that is received by different devices. Alternatively, different sets of transmitted pulses may be sent to different devices (e.g., using different code channels). Likewise, different sets of received pulses may have been transmitted by different devices (e.g., using different code channels).

FIG. 11 illustrates several sample operations that may be performed to transmit and receive sub-packets. Block 1102 represents the commencement of impulse-based packet transmission over a given frequency band. As discussed herein the impulse based signaling scheme may optionally employ time hopping.

As represented by block 1104, the processor 306 (FIG. 3) may format information (e.g., packet data) for transmission. For example, in some implementations the processor 306 may encode the information to be transmitted by generating a series of symbols representative of the current portion of the packet to be transmitted. Here, each symbol may be representative of one or more bits of information from this sub-packet. It should be appreciated that in some implementations symbols representative of the data to be transmitted may be generated by a modulation scheme (e.g., with or without prior encoding). In any event, the pulse generator 326 may generate one or more pulses representative of each symbol. Hence, each pulse set of FIG. 10 may represent a portion of a symbol, an entire symbol, or several symbols.

As represented by block 1106, the transceiver 302 also may commence substantially concurrent reception of packets over the selected frequency band and, optionally, time hopping. As represented by block 1108, in an apparatus 300 that employs inter-pulse duty cycling as taught herein, the duty cycling state may be changed to a powered-on state.

As represented by block 1110 the transmitter 324 transmits a first set of a least one pulse (e.g., pulse 1002 in FIG. 10). As discussed herein the first pulse set may comprise at least a portion of a packet. As will be discussed in more detail below in conjunction with FIGS. 13 and 14, in some implementations coexisting transmission and reception of sub-packets may be employed in conjunction with multicasting operations. As represented by block 1112, after the first pulse set has been transmitted, the duty cycling state may be changed back to a powered-off state until the next transmission or reception (e.g., at block 1114).

As represented by block 1114, the receiver 340 receives at least one pulse (e.g., pulses 1004) over the common frequency band. Here, it should be appreciated that the same radio front-end may be used for receiving the at least one pulse as was used for transmitting the first pulse set at block 1110. As mentioned above in conjunction with block 1110, this reception of pulses may be related to a multicasting operation. As represented by block 1116, after the at least one pulse has been received, the duty cycling state may be changed back to a powered-off state until the next transmission or reception (e.g., at block 1118).

As represented by block 1118 the transmitter 324 transmits a second set of a least one pulse (e.g., pulse 1006). Again, this second pulse set may comprise at least a portion of a packet. As represented by block 1120, after the second pulse set has been transmitted, the duty cycling state may be changed back to a powered-off state until the next transmission or reception.

As represented by block 1122, the above operations may be repeated as necessary to repeatedly transmit and receive sub-packets over the common frequency band. Although the discussion above referred primarily to the transmission and reception of sub packets, in some aspects one or more of the sets of pulses may comprise an entire packet or more than an entire packet. As represented by block 1124, the at least one pulse received at block 1114 may be processed (e.g., decoded) as discussed herein.

Referring now to FIG. 12, in some aspects provisions may be made to account for collisions that may occur or could potentially occur between a transmit pulse and a receive pulse. That is, at some points in time a pulse may be transmitted at the same or substantially the same point in time as a pulse is being received.

As represented by block 1202, an error correction processor component 362 may identify a collision of transmit and receive pulses. This identification may be made after a collision has happened, as a collision is happening, or in some aspects may be predicted based on known or expected transmission and reception times.

As represented by block 1204, the component 362 may adjust the error correction being used for the channel based on identification of the collision. Here, whenever a collision is detected, this information may be fed into the error correction scheme. The error correction scheme may then be configured to take some action whenever there is a collision. For example, in some implementations the component 362 may mark the corresponding transmitted or received pulse as an erasure (e.g., in a convolutional code, mark the bit with a zero confidence level). In a typical implementation the component 362 may mark the transmit pulse as an erasure since this may be easier than having a remote receiver attempt to determine whether or not there was a transmission.

As represented by block 1206, in some aspects the component 362 may determine a confidence level associated with received pulses. For example, some applications may employ error correction schemes whereby a confidence level may be assigned to the received data, indicative of a degree to which the received data accurately represents the information that was transmitted by the remote transmitter. Here, depending upon the error correction scheme employed and the characteristics of the channel, the confidence level may be relatively high even though one or more pulses may have been corrupted during transmission through the channel.

As represented by block 1208, the component 362 may then determine based on the confidence level whether it needs to receive the pulse in question (e.g., associated with a collision or potential collision). For example, if there is a high level of confidence regarding the received information it may not be necessary to receive this pulse since the pulse would simply be redundant information. Thus, in this case the component 362 may simply ignore the received pulse. In addition, in the event the received pulse would arrive at a time that the transmitter 324 wishes to transmit a pulse, the transceiver 302 may be allowed to transmit the pulse anyway. In contrast, if the channel is relatively noisy or if the receiver 340 is having difficulty receiving the information for some other reason, the component 362 may determine that it needs to try to decode the information associated with the pulse. From the above it should be appreciated that the component 362 may dynamically determine the action to be taken in the event of a collision or potential coalition.

Figure 13:
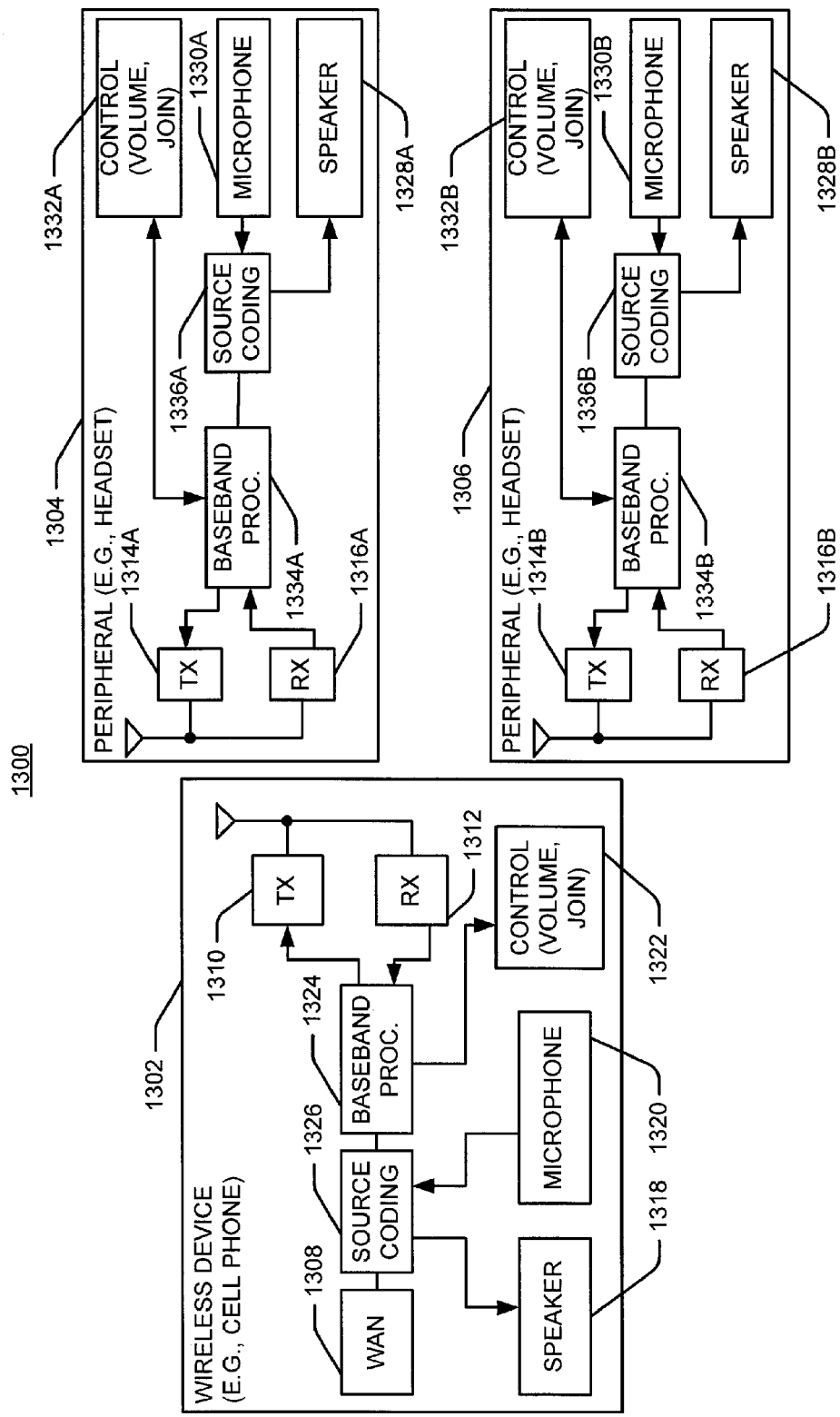
FIG. 13 is a simplified block diagram of several sample aspects of a wireless communication system.

Referring now to FIG. 13, in some aspects the disclosure relates to communication between a wireless device (e.g., a cell phone, a personal entertainment device such as an MP3 player or a video player, a personal data assistant, a computer, and so on) and multiple peripherals (e.g., headsets) via several wireless communication links. In some aspects these components multicast via the wireless communication links. For example, a wireless device may directly establish a multi-way conference call between itself and several headsets via wireless links. In some aspects the wireless links may utilize impulse-based signaling as taught herein. In this case, the devices also may support inter-pulse duty cycling to save power as discussed herein.

In the example of FIG. 13 a wireless communication system 1300 includes a wireless device 1302 and two peripherals 1304 and 1306. It should be appreciated, however, that a given implementation may incorporate more peripherals. The wireless device 1302 may communicate with a cellular network via a wide area network component 1308. In addition, the wireless device 1302 may establish the wireless communication links with the peripherals 1304 and 1306 via a transmitter 1310 and a receiver 1312. Similarly, the peripherals 1304 and 1306 include corresponding transmitters 1314A and 1314B and receivers 1316A and 1316B, respectively.

Each of the devices 1302, 1304, and 1306 in FIG. 13 also may include various components for communicating with one another or some other device (not shown). For example, the device 1302 includes speaker 1318, a microphone 1320, a control device (e.g., for adjusting volume and joining a call) 1322, a baseband processor 1324, and a source coding component 1326. The device 1304 includes speaker 1328A, a microphone 1330A, a control device 1332A, a baseband processor 1334A, and a source coding component 1336A. Similarly, the device 1306 includes speaker 1328B, a microphone 1330B, a control device 1332B, a baseband processor 1334B, and a source coding component 1336B.

Sample operations of the devices 1302, 1304, and 1306 will now be discussed in conjunction with the flowcharts of FIG. 14. As represented by block 1402 in FIG. 14A initially the wireless device 1302 establishes the wireless communication links with the peripherals 1304 and 1306. In some aspects this may involve temporarily pairing each peripheral 1304 and 1306 with the wireless device 1302 for the duration of a communication session (e.g., a phone call). In some implementations the peripherals 1304 and 1306 may be synchronized to the wireless device 1302.

In some aspects multicasting may be implemented using a wireless multicast link and wireless unicast links or only using wireless unicast links. For example, in some implementations a multicast link may be established to send multicast data from the wireless device 1302 to both of the peripherals 1304 and 1306. In this case, separate unicast links may then be established to send data from each peripheral 1304 and 1306 to the wireless device 1302. Conversely, in some implementations separate unicast links, rather than a multicast link, may be established to send multicast data from the wireless device to each of the peripherals 1304 and 1306.

In a sample use case, a conference call may be established using a single wireless device (e.g., a cell phone) and multiple headsets. In some implementations, the cell phone may use a multicast link (or unicast links) to send multicast data to the headsets. The headsets in turn may send data back to the cell phone via separate unicast links (or multicast links). This data may include, for example, microphone data and side tone data. The cell phone also may receive data from other sources such as, for example, data from a wide area network (e.g., an incoming signal associated with a call over a cellular network). The cell phone may then mix the incoming data (e.g., the microphone data, side tone data, etc.) and send the mixed data to the devices (e.g., the peripherals and the wide area network). Thus, the cell phone may multicast the microphone data (as mixed with other audio data, if applicable) to the headsets via one or more wireless links.

In some implementations the wireless communication links may utilize impulse-based signaling as taught herein. For example, each unicast link may employ a low duty cycle, pulse time hopping, inter-pulse duty cycling, or any other technique taught herein. In addition, the multicast-related links may be realized using sub-packet transmission and reception via a comment frequency band as described herein (e.g., at FIGS. 10-12).

Figure 14A:
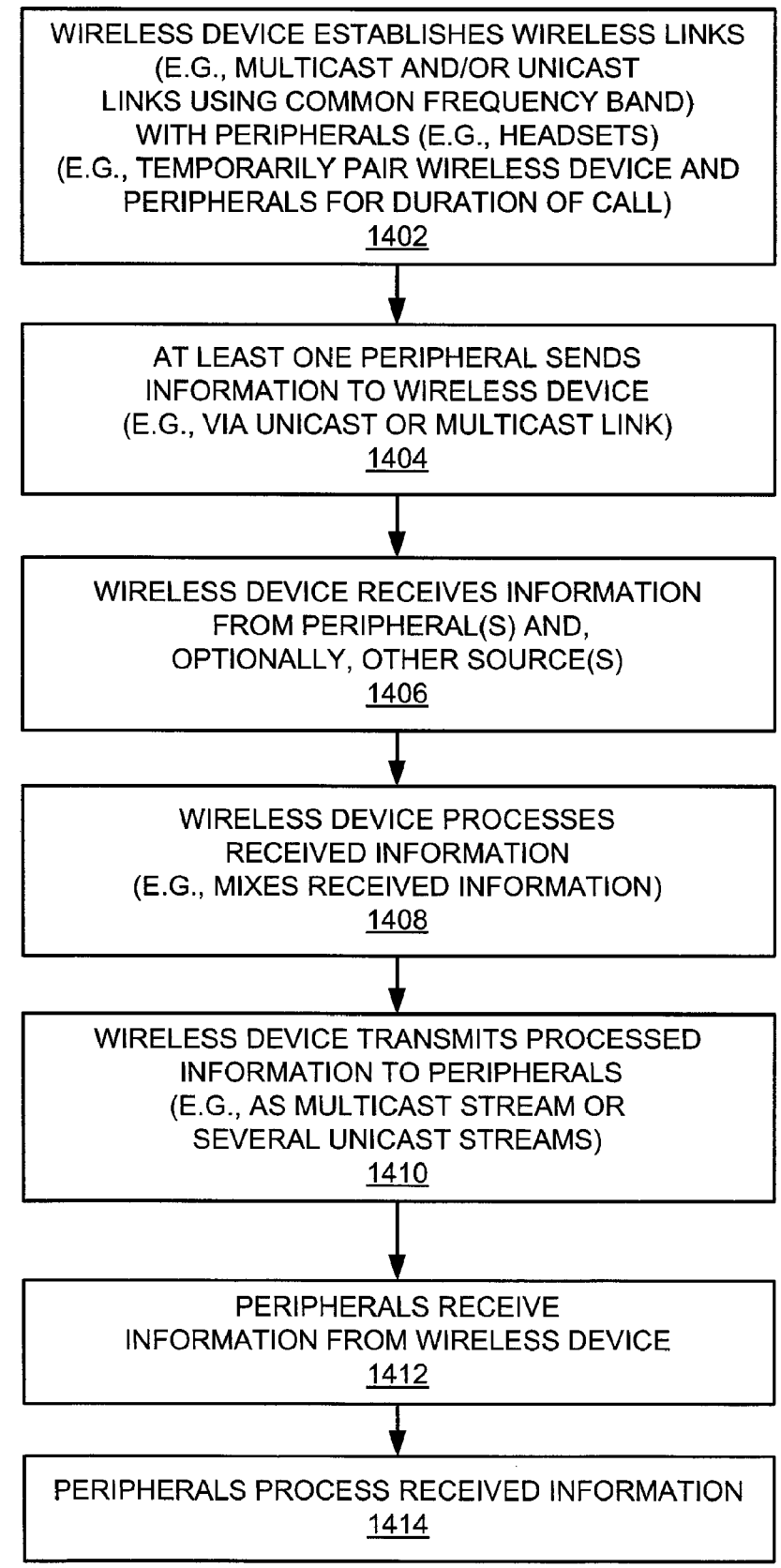

As represented by block 1404 in FIG. 14A, one of the peripherals 1304 or 1306 sends information to the wireless device 1302. As discussed above this may be accomplished via a wireless unicast link, or via one direction of a sub-packet transmit and receive link (e.g., pulses 1004 of FIG. 10).

As represented by block 1406, the wireless device 1302 receives the information from the peripheral(s) and, in some cases, from some other source or sources. Here, another source may include another one of the peripherals 1304 or 1306 or some other communication device associated with the current communication session (not shown). For example, in the case of a conference call the wireless device 1302 may be connected to another caller via a cellular network.

As represented by block 1408, the wireless device 1302 processes the information received from the peripheral(s) and any other source device. For example, the wireless device 1302 (e.g., the baseband processor 1324) may mix the received information (e.g., audio signals).

As represented by block 1410, the wireless device 1302 transmits the processed information to the peripherals 1304 and 1306 and, if applicable, any other devices associated with the current communication session. As mentioned above, in some implementations the wireless device 1302 may transmit the processed information as a single multicast stream via a single wireless communication link. In this case, each peripheral will receive the stream from the multicast link. In other implementations the wireless device 1302 may transmit the processed information as multiple unicast streams via multiple wireless communication links. In still other implementations the wireless device 1302 may transmit via one direction of a sub-packet transmit and receive link (e.g., pulses 1002 and 1006 of FIG. 10).

As represented by block 1412, the peripherals 1304 and 1306 receive the processed information from the wireless device 1302. The peripherals 1304 and 1306 then process the received information as necessary (block 1414).

As mentioned above a peripheral (e.g., peripheral 1304) may transmit various types of data (i.e., information) and may transmit the data in various ways. Several additional sample operations of a peripheral will now be treated in conjunction with the flowchart of FIG. 14B.

As represented by block 1420, the peripheral may obtain data to be transmitted from one or more data sources. For example, the peripheral may obtain data from its microphone. In addition, the peripheral may receive data from the wireless device 1302, from one or more other peripherals, from some other source, or from some combination of these sources. As an example, the peripheral 1304 may receive microphone data from the peripheral 1306 via a wireless link.

As represented by block 1422, the peripheral may process the data it obtained in some manner to facilitate transmitting the data. For example, in some implementations the peripheral (e.g., the baseband processor 1334A) may mix the data (e.g., the microphone data from multiple sources).

As represented by block 1424, the peripheral may then transmit the processed data to an appropriate destination or destinations. In some implementations the peripheral may transmit the data to another device (e.g., the wireless device 1302 or the peripheral 1306) via a unicast link. In some implementations the peripheral may transmit the data to several devices (e.g., the wireless device 1302 and the peripheral 1306) via several unicast links. In some implementations the peripheral may transmit the data to several devices (e.g., the wireless device 1302 and the peripheral 1306) via a multicast link. Thus, in this case the cell phone may multicast some or all of the microphone data from multiple headsets (as mixed with other audio data, if applicable) to the headsets or other devices via the wireless links.

Figure 15:
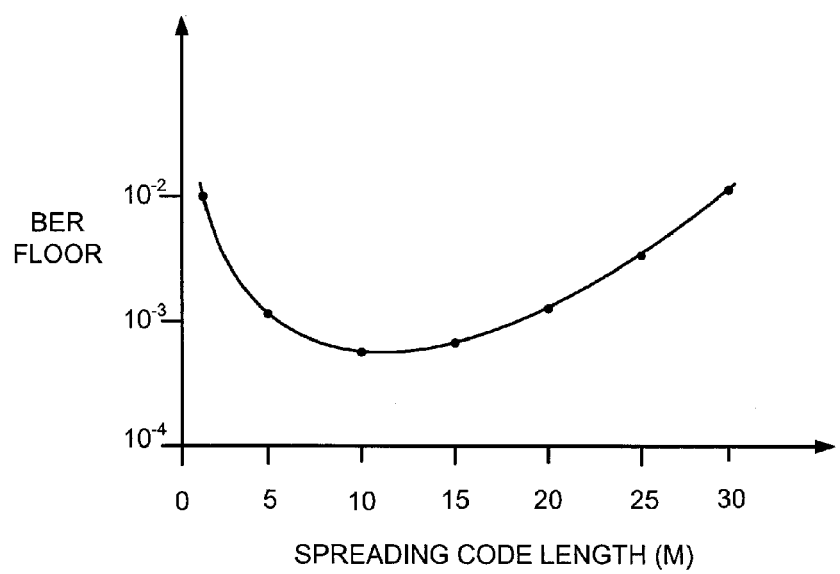
FIG. 15 is a simplified diagram of a sample waveform illustrating a possible effect of using multiple pulses to represent a bit.

Referring now to FIG. 15, as mentioned above in some implementations a device that utilizes pulse-based ultra-wideband communication may employ various coding techniques to improve the reliability of data-transmission over a channel. In some aspects, the disclosure relates to using multiple pulses per bit to provide improved interference performance in a non-coherent ultra-wideband system.

In ultra-wideband systems with non-coherent receivers, a single pulse per bit has traditionally been used to minimize non-coherent combining losses and obtain the best performance in noise-limited channels. For example, a typical non-coherent ultra-wideband ("UWB") receiver (e.g., pursuant to IEEE 802.15.4a) and implementations that accommodate such receivers may use a very high rate (close to rate one) coded pulses in combination with time-hopping diversity.

Due to the presence of noise-noise cross terms in a non-coherent receiver, using more than one pulse per bit may lead to an effective loss in the $E_b/N_o$ requirement. As an example, in a binary pulse position modulation ("BPPM") UWB system, for every doubling of the spread factor, there is approximately 1 dB of loss in $E_b/N_o$ at the target un-coded BER=$10^{-3}$. This means that every doubling of the spread factor delivers only 2 dB of spreading gain, instead of 3 dB in the case of a coherent receiver. Due to this non-coherent combining loss, conventional designs use a high rate code (e.g., a Reed-Solomon code) leading to a pulse per bit value close to one.

However, more than one pulse per bit may be advantageously employed when the system is interference-limited. To illustrate this point, an example of a hypothetical system will described. In this hypothetical system, the following condition are defined for the transmitter: 1) The system does not use any coding other than repetition (e.g., PN sequence) based spreading; 2) The parameters are chosen such that there is no inter-pulse, inter-pulse position hypothesis, or inter-symbol interference issues within a link; and 3) Any time-hopping sequence chosen is i.i.d. uniform distributed within and between users over the possible pulse locations. In addition, the following parameters are defined: 1) The system may produce N non-overlapping binary pulse position modulated symbol locations per un-coded bit. Here, each BPPM symbol consists of two non-overlapping positions denoting '1' and '0'. Hence, this means that there are 2N pulse locations in total; and 2) The spreading code length is M. Then, each pulse may have T=N/M possible time-hopping locations. Finally, the following conditions are defined for the receiver: 1) The integrator captures all the energy in the BPPM symbol location; and 2) BPPM detection uses a hard detector. This means that if energy at pulse position corresponding to '1' is larger than that in '0', the detector decides in favor of '1'.

Next, it is assumed that the link of interest is operating under the presence of a much stronger interferer. Since each user is assumed to have i.i.d. uniform time-hopping sequence, the probability that a pulse sent by the interferer falls in one of the two time hopped BPPM hypothesis locations corresponding to the user of interest may be 1/T. The interference may thus help or hinder accurate detection of a pulse depending on where the interfering pulses fall in one of the two time hopped BPPM hypothesis locations. Hence, the average pulse error rate may be 1/(2 T).

Under the above conditions, for odd values of M, the BER error floor may be:

$$BER_{Floor} = \sum_{i=0}^{\lfloor M/2 \rfloor} C(M,i)\left(\frac{1}{2T}\right)^{M-i}\left(1-\frac{1}{2T}\right)^{i} \quad \text{EQUATION 1}$$

This leads to a trade-off between the spreading code length (M) and the BER floor under interference. For N=50, an example of this trade-off is plotted in FIG. 15. This plot illustrates that the behavior of the system under interference may benefit from a large number of pulses per bit (e.g., five or more). Hence, multiple pulses per bit may be advantageously employed in a time hopped non-coherent system to improve performance in an interference-limited region.

From the above it should be appreciated that impulse-based signaling as taught herein may be advantageously employed in an apparatus having ultra-low power requirements. In some implementations the teachings herein may be employed to achieve spectral efficiencies of less than 0.1 bit/second/Hz. Such techniques may be advantageously employed for short-range communication to, for example, send data between a cell phone and a wristwatch, where the wrist watch may typically consume an amount of power on the order of a few microwatts. Similarly, these techniques may be employed to send data between a cell phone and an in-ear headset (e.g., similar to a hearing aid), where the headset may typically consume an amount of power on the order of a few milliwatts.

A wireless device may include various components that perform functions based on signals that are transmitted by or received at the wireless device. For example, a headset may include a transducer adapted to provide an audible output based on: pulses that are received via a wireless link, decoded information, one or more received pulses, or processed information. A watch may include a display adapted to provide a visual output based on: pulses that are received via a wireless link, decoded information, one or more received pulses, or processed information. A medical device may include a sensor adapted to generate sensed data: to be transmitted by a transmitter, for transmission via a wireless link, to provide one or more transmitted pulses, or to be transmitted to a cell phone.

A wireless device may communicate via one or more wireless communication links that are based on or otherwise support any suitable wireless communication technology. For example, in some aspects a wireless device may associate with a network. In some aspects the network may comprise a body area network or a personal area network (e.g., an ultra-wideband network). In some aspects the network may comprise a local area network or a wide area network. A wireless device may support or otherwise use one or more of a variety of wireless communication protocols or standards including, for example, CDMA, TDMA, OFDM, OFDMA, WiMAX, Wi-Fi, and other wireless technologies. Similarly, a wireless device may support or otherwise use one or more of a variety of corresponding modulation or multiplexing schemes. A wireless device may thus include appropriate components (e.g., air interfaces) to establish and communicate via one or more wireless communication links using the above or other wireless communication technologies. For example, a device may comprise a wireless transceiver with associated transmitter and receiver components (e.g., transmitter 326 and the receiver 340) that may include various components (e.g., signal generators and signal processors) that facilitate communication over a wireless medium.

As mentioned above, in some aspects a wireless device may communicate via ultra-wideband pulses. In some aspects each of the ultra-wideband pulses may have a bandwidth on the order of 1-2 GHz. In some aspects each of the ultra-wideband pulses may have a frequency band (i.e., frequency range) within a range of approximately 6 GHz to 10 GHz. In some aspects each of the ultra-wideband pulses may have a frequency band within a range of approximately 7.25 GHz to 9 GHz. In some aspects each of the ultra-wideband pulses may have a time duration on the order of 20 nanoseconds of less.

The teachings herein may be incorporated into (e.g., implemented within or performed by) a variety of apparatuses (e.g., devices). For example, one or more aspects taught herein may be incorporated into a phone (e.g., a cellular phone), a personal data assistant ("PDA"), an entertainment device (e.g., a music or video device), a headset (e.g., including a headphones, an earpiece, a microphone, or some combination of two or more of these devices), a microphone, a medical device (e.g., a biometric sensor, a heart rate monitor, a pedometer, an EKG device, etc.), a user I/O device (e.g., a watch, a remote control, a light switch, a keyboard, a mouse, etc.), a tire pressure monitor, a computer, a point-of-sale device, an entertainment device, a hearing aid, a set-top box, or any other suitable device.

These devices may have different power and data requirements. In some aspects, the teachings herein may be adapted for use in low power applications (e.g., through the use of a impulse-based signaling scheme and low duty cycle modes) and may support a variety of data rates including relatively high data rates (e.g., through the use of high-bandwidth pulses).

In some aspects a wireless device may comprise an access device (e.g., a Wi-Fi access point) for a communication system. Such an access device may provide, for example, connectivity to another network (e.g., a wide area network such as the Internet or a cellular network) via a wired or wireless communication link. Accordingly, the access device may enable another device (e.g., a Wi-Fi station) to access the other network or some other functionality. In addition, it should be appreciated that one or both of the devices may be portable or, in some cases, relatively non-portable.

The components described herein may be implemented in a variety of ways. Referring to FIGS. 16-21, apparatuses 1600, 1650, 1700, 1750, 1800, 1900, 2000, 2050, 2100, and 2150 are represented as a series of interrelated functional blocks that may represent functions implemented by, for example, one or more integrated circuits (e.g., an ASIC) or may be implemented in some other manner as taught herein. As discussed herein, an integrated circuit may include a processor, software, other components, or some combination thereof.

Figure 16:
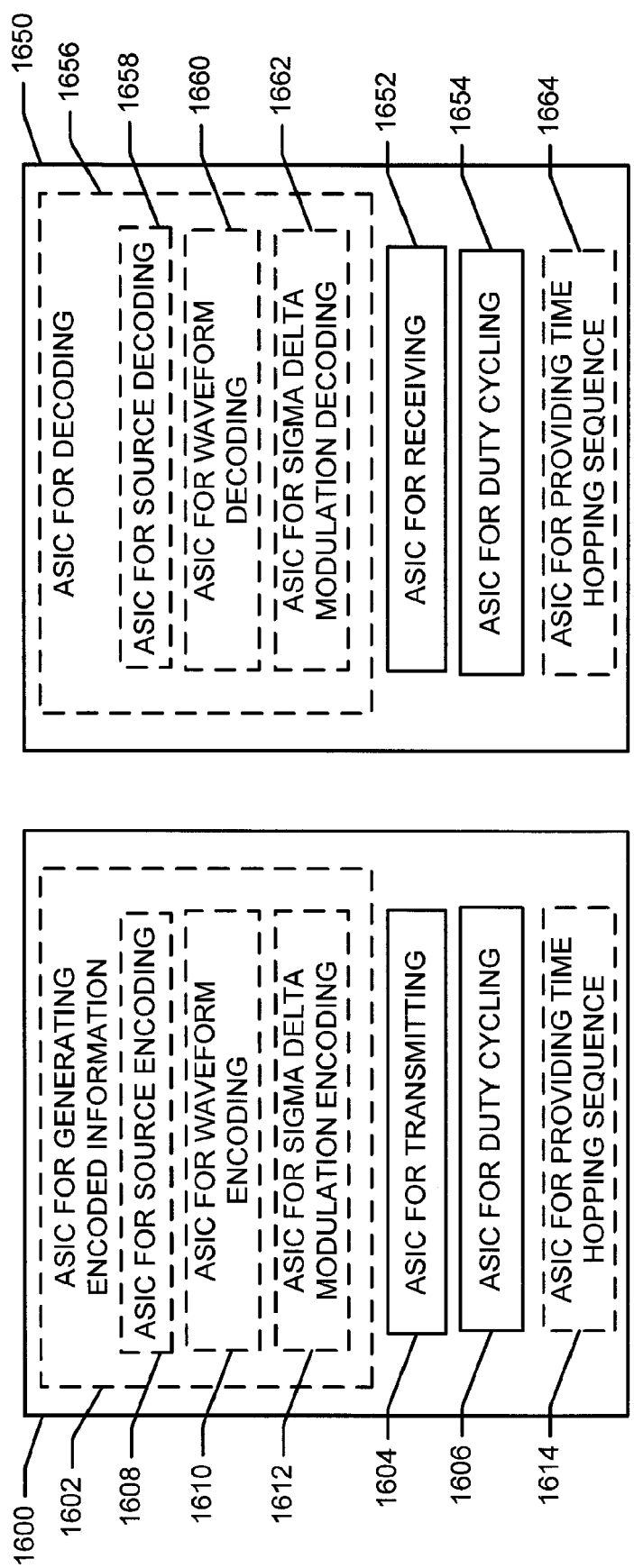

As shown in FIG. 16, the apparatus 1600 may include one or more modules 1602, 1604, 1606, 1608, 1610, 1612, and 1614 that may perform one or more of the functions described above with regard to various figures. For example, an ASIC for generating encoded information 1602 may correspond to, for example, component 320 discussed above. An ASIC for transmitting 1604 may correspond to, for example, component 324 discussed above. An ASIC for duty cycling 1606 may correspond to, for example, component 312 discussed above. An ASIC for source encoding 1608 may correspond to, for example, component 320 discussed above. An ASIC for waveform encoding 1610 may correspond to, for example, component 320 discussed above. An ASIC for sigma delta modulation encoding 1612 may correspond to, for example, component 320 discussed above. An ASIC for providing a time hopping sequence 1614 may correspond to, for example, component 342 discussed above.

The apparatus 1650 may include one or more modules 1652, 1654, 1656, 1658, 1660, 1662, and 1664 that may perform one or more of the functions described above with regard to various figures. For example, an ASIC for receiving 1652 may correspond to, for example, component 340 discussed above. An ASIC for duty cycling 1654 may correspond to, for example, component 312 discussed above. An ASIC for decoding 1656 may correspond to, for example, component 352 discussed above. An ASIC for source decoding 1658 may correspond to, for example, component 352 discussed above. An ASIC for waveform decoding 1660 may correspond to, for example, component 352 discussed above. An ASIC for sigma delta modulation decoding 1662 may correspond to, for example, component 352 discussed above. An ASIC for providing a time hopping sequence 1664 may correspond to, for example, component 342 discussed above.

As shown in FIG. 17, the apparatus 1700 may include one or more modules 1702, 1704, 1706, and 1708 that may perform one or more of the functions described above with regard to various figures. For example, an ASIC for transmitting 1702 may correspond to, for example, component 324 discussed above. An ASIC for duty cycling 1704 may correspond to, for example, component 312 discussed above. An ASIC for providing a random sequence 1706 may correspond to, for example, component 342 discussed above. An ASIC for generating encoded information 1708 may correspond to, for example, component 320 discussed above.

The apparatus 1750 may include one or more modules 1752, 1754, 1756, and 1758 that may perform one or more of the functions described above with regard to various figures. For example, an ASIC for receiving 1752 may correspond to, for example, component 340 discussed above. An ASIC for duty cycling 1754 may correspond to, for example, component 312 discussed above. An ASIC for providing a random sequence 1756 may correspond to, for example, component 342 discussed above. An ASIC for decoding 1758 may correspond to, for example, component 352 discussed above.

As shown in FIG. 18, the apparatus 1800 may include one or more modules 1802, 1804, 1806, 1808 that may perform one or more of the functions described above with regard to various figures. For example, an ASIC for using power 1802 may correspond to, for example, component 302 discussed above. An ASIC for duty cycling 1804 may correspond to, for example, component 312 discussed above. An ASIC for charging 1806 may correspond to, for example, component 314 discussed above. An ASIC for varying 1808 may correspond to, for example, component 316 discussed above.

The apparatus 1900 may include one or more modules 1902, 1904, 1906, 1908, and 1910 that may perform one or more of the functions described above with regard to various figures. For example, an ASIC for transmitting 1902 may correspond to, for example, component 324 discussed above. An ASIC for receiving 1904 may correspond to, for example, component 340 discussed above. An ASIC for error correcting 1906 may correspond to, for example, component 362 discussed above. An ASIC for duty cycling 1908 may correspond to, for example, component 312 discussed above. An ASIC for varying 1910 may correspond to, for example, component 316 discussed above.

As shown in FIG. 20, the apparatus 2000 may include one or more modules 2002 and 2004 that may perform one or more of the functions described above with regard to various figures. For example, an ASIC for communicating 2002 may correspond to, for example, component 302 discussed above. An ASIC for processing 2004 may correspond to, for example, component 304 and/or component 306 discussed above.

The apparatus 2050 may include one or more modules 2052, 2054, and 2056 that may perform one or more of the functions described above with regard to various figures. For example, an ASIC for receiving 2052 may correspond to, for example, component 340 discussed above. An ASIC for processing 2054 may correspond to, for example, component 304 and/or component 306 discussed above. An ASIC for transmitting 2056 may correspond to, for example, component 324 discussed above.

As shown in FIG. 21, the apparatus 2100 may include one or more modules 2102 and 2104 that may perform one or more of the functions described above with regard to various figures. For example, an ASIC for multicasting 2102 may correspond to, for example, component 302 discussed above.

An ASIC for processing 2104 may correspond to, for example, component 304 and/or component 306 discussed above.

The apparatus 2150 may include one or more modules 2152, 2154, and 2156 that may perform one or more of the functions described above with regard to various figures. For example, an ASIC for receiving 2152 may correspond to, for example, component 340 discussed above. An ASIC for processing 2154 may correspond to, for example, component 304 and/or component 306 discussed above. An ASIC for transmitting 2156 may correspond to, for example, component 324 discussed above.

As noted above, in some aspects these components may be implemented via appropriate processor components. These processor components may in some aspects be implemented, at least in part, using structure as taught herein. In some aspects a processor may be adapted to implement a portion or all of the functionality of one or more of these components. In some aspects one or more of the components represented by dashed boxes are optional.

As noted above, the apparatuses of FIGS. 16-21 may comprise one or more integrated circuits that provide the functionality of the corresponding components. For example, in some aspects a single integrated circuit may implement the functionality of the illustrated components, while in other aspects more than one integrated circuit may implement the functionality of the illustrated components.

In addition, the components and functions represented by FIGS. 16-21, as well as other components and functions described herein, may be implemented using any suitable means. Such means also may be implemented, at least in part, using corresponding structure as taught herein. For example, in some aspects means for generating encoded information may comprise an encoder, means for transmitting may comprise a transmitter, means for duty cycling may comprise a state controller, means for source encoding may comprise a source encoder, means for waveform encoding may comprise a waveform encoder, means for sigma delta modulation encoding may comprise a sigma delta modulation encoder, means for providing a time hopping sequence may comprise a time hopping sequence controller, means for receiving may comprise a receiver, means for decoding may comprise a decoder, means for source decoding may comprise a source decoder, means for waveform decoding may comprise a waveform decoder, means for sigma delta modulation decoding may comprise a sigma delta modulation decoder, means for providing a random sequence may comprise a time hopping sequence controller, means for using power may comprise a transceiver, means for charging may comprise a charging circuit, means for error correcting may comprise an error correction processor, means for communicating may comprise a transceiver, means for processing may comprise a processor, means for multicasting may comprise a transceiver, and means for varying may comprise a pulse timing controller. One or more of such means also may be implemented in accordance with one or more of the processor components of FIGS. 16-21.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that any of the various illustrative logical blocks, modules, processors, means, circuits, and algorithm steps described in connection with the aspects disclosed herein may be implemented as electronic hardware (e.g., a digital implementation, an analog implementation, or a combination of the two, which may be designed using source coding or some other technique), various forms of program or design code incorporating instructions (which may be referred to herein, for convenience, as "software" or a "software module"), or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the aspects disclosed herein may be implemented within or performed by an integrated circuit ("IC"), an access terminal, or an access point. The IC may comprise a general purpose processor, a digital signal processor (DSP), an application specific integrated circuit (ASIC), a field programmable gate array (FPGA) or other programmable logic device, discrete gate or transistor logic, discrete hardware components, electrical components, optical components, mechanical components, or any combination thereof designed to perform the functions described herein, and may execute codes or instructions that reside within the IC, outside of the IC, or both. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

It is understood that any specific order or hierarchy of steps in any disclosed process is an example of a sample approach. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

The steps of a method or algorithm described in connection with the aspects disclosed herein may be embodied directly in hardware, in a software module executed by a processor, or in a combination of the two. A software module (e.g., including executable instructions and related data) and other data may reside in a data memory such as RAM memory, flash memory, ROM memory, EPROM memory, EEPROM memory, registers, a hard disk, a removable disk, a CD-ROM, or any other form of computer-readable storage medium known in the art. A sample storage medium may be coupled to a machine such as, for example, a computer/processor (which may be referred to herein, for convenience, as a "processor") such the processor can read information (e.g., code) from and write information to the storage medium. A sample storage medium may be integral to the processor. The processor and the storage medium may reside in an ASIC. The ASIC may reside in user equipment. In the alternative, the processor and the storage medium may reside as discrete components in user equipment. Moreover, in some aspects any suitable computer-program product may comprise a computer-readable medium comprising codes (e.g., executable by at least one computer) relating to one or more of the aspects of the disclosure. In some aspects a computer program product may comprise packaging materials.

The previous description of the disclosed aspects is provided to enable any person skilled in the art to make or use the present disclosure. Various modifications to these aspects will be readily apparent to those skilled in the art, and the generic principles defined herein may be applied to other aspects without departing from the scope of the disclosure. Thus, the present disclosure is not intended to be limited to the aspects shown herein but is to be accorded the widest scope consistent with the principles and novel features disclosed herein.

The invention claimed is:

1. A method of concurrent transmission and reception of packets involving interspersed transmission and reception of portions of the packets by a transceiver, comprising:
   transmitting, by the transceiver, a first set of at least one pulse that represents a portion of a first packet;
   after the transmission of the first set of at least one pulse, receiving, by the transceiver, at least one pulse that represents a portion of a second packet; and
   after the reception of the at least one pulse of the second packet, transmitting, by the transceiver, a second set of at least one pulse that represents another portion of the first packet before receiving at least one other pulse that represents another portion of the second packet.

2. The method of claim 1, wherein a common frequency band is used in the transmission and the reception of the pulses.

3. The method of claim 2, wherein a time duration between the transmission of the first set of at least one pulse and the transmission of the second set of at least one pulse is less than or equal to 20 microseconds.

4. The method of claim 1, wherein at least one time hopping scheme is used to transmit and to receive the pulses.

5. The method of claim 1, wherein the at least one other pulse represents a remaining portion of the second packet.

6. The method of claim 1, wherein the at least one received pulse comprises less than 100 pulses.

7. The method of claim 1, wherein a time duration between the transmission of the first set of at least one pulse and the transmission of the second set of at least one pulse is less than or equal to 20 microseconds.

8. The method of claim 1, wherein each of the pulses has a time duration on the order of 20 nanoseconds or less.

9. The method of claim 1, wherein each of the pulses has a frequency band within a range of 6 gigahertz to 10 gigahertz.

10. The method of claim 1, wherein each of the pulses has a fractional bandwidth on the order of 20% or more, has a bandwidth on the order of 500 megahertz or more, or has a fractional bandwidth on the order of 20% or more and has a bandwidth on the order of 500 megahertz or more.

11. The method of claim 1, further comprising duty cycling between the transmissions or receptions of the pulses.

12. The method of claim 1, further comprising varying an inter-pulse time duration between the transmissions or receptions of the pulses.

13. The method of claim 12, wherein the inter-pulse time duration is varied based on at least one of the group consisting of: a variable pulse repetition period, a variable coding rate, and a time hopping sequence.

14. The method of claim 1, wherein the at least one received pulse represents a data symbol that represents at least one data bit.

15. The method of claim 1, wherein:
   the portions of the first and second packets are alternately transmitted and received over a common frequency band.

16. The method of claim 1, wherein:
   traffic for a multicasting session is carried by the transmitted and received pulses; and
   a common frequency band is used in the transmission and the reception of the pulses.

17. The method of claim 1, wherein:
   the transmitted pulses are associated with a multicast stream transmitted to a plurality of devices;
   the at least one received pulse is associated with at least one of a plurality of unicast streams received from the devices; and
   a common frequency band is used in the transmission and the reception of the pulses.

18. The method of claim 1, further comprising:
   identifying a collision between a transmitted pulse and a received pulse; and
   adjusting an error correction scheme based on the identification of the collision.

19. The method of claim 18, further comprising dynamically determining whether to process the received pulse associated with the collision.

20. The method of claim 19, wherein the determination is based on a confidence level associated with reception of received pulses.

21. An apparatus for concurrent transmission and reception of packets involving interspersed transmission and reception of portions of the packets, comprising:
   a transceiver, comprising:
      a transmitter adapted to transmit a first set of at least one pulse that represents a portion of a first packet; and
      a receiver adapted to receive, after the transmission of the first set of at least one pulse, at least one pulse that represents a portion of a second packet; and
      wherein the transmitter is further adapted to transmit, after the reception of the at least one pulse, a second set of at least one pulse that represents another portion of the first packet before the receiver receives at least one other pulse that represents another portion of the second packet.

22. The apparatus of claim 21, wherein the transmitter and the receiver use a common frequency band for the transmission and the reception of the pulses.

23. The apparatus of claim 22, wherein a time duration between the transmission of the first set of at least one pulse and the transmission of the second set of at least one pulse is less than or equal to 20 microseconds.

24. The apparatus of claim 21, wherein the transmitter and the receiver use at least one time hopping scheme to transmit and to receive the pulses.

25. The apparatus of claim 21, wherein the at least one other pulse represents a remaining portion of the second packet.

26. The apparatus of claim 21, wherein the at least one received pulse comprises less than 100 pulses.

27. The apparatus of claim 21, wherein a time duration between the transmission of the first set of at least one pulse and the transmission of the second set of at least one pulse is less than or equal to 20 microseconds.

28. The apparatus of claim 21, wherein each of the pulses has a time duration on the order of 20 nanoseconds or less.

29. The apparatus of claim 21, wherein each of the pulses has a frequency band within a range of 6 gigahertz to 10 gigahertz.

30. The apparatus of claim 21, wherein each of the pulses has a fractional bandwidth on the order of 20% or more, has a bandwidth on the order of 500 megahertz or more, or has a fractional bandwidth on the order of 20% or more and has a bandwidth on the order of 500 megahertz or more.

31. The apparatus of claim 21, further comprising a state controller adapted to provide duty cycling between the transmissions or receptions of the pulses.

32. The apparatus of claim 21, further comprising a pulse timing controller adapted to vary an inter-pulse time duration between the transmissions or receptions of the pulses.

33. The apparatus of claim 32, wherein the inter-pulse time duration is varied based on at least one of the group consisting of: a variable pulse repetition period, a variable coding rate, and a time hopping sequence.

34. The apparatus of claim 21, wherein the at least one received pulse represents a data symbol that represents at least one data bit.

35. The apparatus of claim 21, wherein:
the transmitter and the receiver alternately transmit and receive the portions of the first and second packets over a common frequency band.

36. The apparatus of claim 21, wherein:
traffic for a multicasting session is carried by the transmitted and received pulses; and
the transmitter and the receiver use a common frequency band for the transmission and the reception of the pulses.

37. The apparatus of claim 21, wherein:
the transmitted pulses are associated with a multicast stream transmitted to a plurality of devices;
the at least one received pulse is associated with at least one of a plurality of unicast streams received from the devices; and
the transmitter and the receiver use a common frequency band for the transmission and the reception of the pulses.

38. The apparatus of claim 21, further comprising an error correction processor adapted to:
identifying a collision between a transmitted pulse and a received pulse; and
adjusting an error correction scheme based on the identification of the collision.

39. The apparatus of claim 38, wherein the error correction processor is further adapted to dynamically determine whether to process the received pulse associated with the collision.

40. The apparatus of claim 39, wherein the determination is based on a confidence level associated with reception of received pulses.

41. An apparatus for concurrent transmission and reception of packets involving interspersed transmission and reception of portions of the packets, comprising:
transceiving means, comprising:
means for transmitting a first set of at least one pulse that represents a portion of a first packet; and
means for receiving, after the transmission of the first set of at least one pulse, at least one pulse that represents a portion of a second packet; and
wherein the means for transmitting transmits, after the reception of the at least one pulse, a second set of at least one pulse that represents another portion of the first packet before the means for receiving receives at least one other pulse that represents another portion of the second packet.

42. The apparatus of claim 41, wherein the means for transmitting and the means for receiving use a common frequency band for the transmission and the reception of the pulses.

43. The apparatus of claim 42, wherein a time duration between the transmission of the first set of at least one pulse and the transmission of the second set of at least one pulse is less than or equal to 20 microseconds.

44. The apparatus of claim 41, wherein the means for transmitting and the means for receiving use at least one time hopping scheme to transmit and to receive the pulses.

45. The apparatus of claim 41, wherein the at least one other pulse represents a remaining portion of the second packet.

46. The apparatus of claim 41, wherein the at least one received pulse comprises less than 100 pulses.

47. The apparatus of claim 41, wherein a time duration between the transmission of the first set of at least one pulse and the transmission of the second set of at least one pulse is less than or equal to 20 microseconds.

48. The apparatus of claim 41, wherein each of the pulses has a time duration on the order of 20 nanoseconds or less.

49. The apparatus of claim 41, wherein each of the pulses has a frequency band within a range of 6 gigahertz to 10 gigahertz.

50. The apparatus of claim 41, wherein each of the pulses has a fractional bandwidth on the order of 20% or more, has a bandwidth on the order of 500 megahertz or more, or has a fractional bandwidth on the order of 20% or more and has a bandwidth on the order of 500 megahertz or more.

51. The apparatus of claim 41, further comprising means for duty cycling between the transmissions or receptions of the pulses.

52. The apparatus of claim 41, further comprising means for varying an inter-pulse time duration between the transmissions or receptions of the pulses.

53. The apparatus of claim 52, wherein the inter-pulse time duration is varied based on at least one of the group consisting of: a variable pulse repetition period, a variable coding rate, and a time hopping sequence.

54. The apparatus of claim 41, wherein the at least one received pulse represents a data symbol that represents at least one data bit.

55. The apparatus of claim 41, wherein:
the means for transmitting and the means for receiving alternately transmit and receive the portions of the first and second packets over a common frequency band.

56. The apparatus of claim 41, wherein:
traffic for a multicasting session is carried by the transmitted and received pulses; and
the means for transmitting and the means for receiving use a common frequency band for the transmission and the reception of the pulses.

57. The apparatus of claim 41, wherein:
the transmitted pulses are associated with a multicast stream transmitted to a plurality of devices;
the at least one received pulse is associated with at least one of a plurality of unicast streams received from the devices; and
the means for transmitting and the means for receiving use a common frequency band for the transmission and the reception of the pulses.

58. The apparatus of claim 41, further comprising means for error correcting by:
identifying a collision between a transmitted pulse and a received pulse; and
adjusting an error correction scheme based on the identification of the collision.

59. The apparatus of claim 58, wherein the means for error correcting dynamically determines whether to process the received pulse associated with the collision.

60. The apparatus of claim 59, wherein the determination is based on a confidence level associated with reception of received pulses.

61. A computer-program product for interspersed transmission and reception of portions of packets comprising:
   non-transitory computer-readable medium encoded with codes executable by a transceiver processor to:
      transmit a first set of at least one pulse that represents a portion of a first packet;
      receive, after the transmission of the first set of at least one pulse, at least one pulse that represents a portion of a second packet; and
      transmit, after the reception of the at least one pulse, a second set of at least one pulse that represents another portion of the first packet before receiving at least one other pulse that represents another portion of the second packet.

62. A headset for wireless communication involving interspersed transmission and reception of portions of packets, comprising:
   a transceiver, comprising:
      a transmitter adapted to transmit a first set of at least one pulse that represents a portion of a first packet;
      a receiver adapted to receive, after the transmission of the first set of at least one pulse, at least one pulse that represents a portion of a second packet;
      wherein the transmitter is further adapted to transmit, after the reception of the at least one pulse, a second set of at least one pulse that represents another portion of the first packet before the receiver receives at least one other pulse that represents another portion of the second packet; and
   a transducer adapted to provide an audible output based in part on the received at least one pulse.

63. A watch for wireless communication involving interspersed transmission and reception of portions of packets, comprising:
   a transceiver, comprising:
      a transmitter adapted to transmit a first set of at least one pulse that represents a portion of a first packet;
      a receiver adapted to receive, after the transmission of the first set of at least one pulse, at least one pulse that represents a portion of a second packet;
      wherein the transmitter is further adapted to transmit, after the reception of the at least one pulse, a second set of at least one pulse that represents another portion of the first packet before the receiver receives at least one other pulse that represents another portion of the second packet; and
   a display adapted to provide a visual output based in part on the received at least one pulse.

64. A medical device for wireless communication involving interspersed transmission and reception of portions of packets, comprising:
   a transceiver, comprising:
      a transmitter adapted to transmit a first set of at least one pulse that represents a portion of a first packet;
      a receiver adapted to receive, after the transmission of the first set of at least one pulse, at least one pulse that represents a portion of a second packet;
      wherein the transmitter is further adapted to transmit, after the reception of the at least one pulse, a second set of at least one pulse that represents another portion of the first packet before the receiver receives at least one other pulse that represents another portion of the second packet; and
   a sensor adapted to generate sensed data to provide pulses to be transmitted by the transmitter.

\* \* \* \* \*